United States Patent
Bauco et al.

(10) Patent No.: US 10,185,111 B2
(45) Date of Patent: Jan. 22, 2019

(54) TRACEABLE END POINT CABLE ASSEMBLY

(71) Applicant: Corning Optical Communications LLC, Hickory, NC (US)

(72) Inventors: Anthony Sebastian Bauco, Horseheads, NY (US); Douglas Llewellyn Butler, Painted Post, NY (US); Ashley Wesley Jones, Denton, TX (US); Jason Clay Lail, Conover, NC (US); Eric Stephan ten Have, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/479,706

(22) Filed: Apr. 5, 2017

(65) Prior Publication Data

US 2017/0293102 A1 Oct. 12, 2017

Related U.S. Application Data

(60) Provisional application No. 62/320,024, filed on Apr. 8, 2016.

(51) Int. Cl.
*G02B 6/36* (2006.01)
*G02B 6/44* (2006.01)
(Continued)

(52) U.S. Cl.
CPC ......... *G02B 6/4482* (2013.01); *G02B 6/3893* (2013.01); *G02B 6/3895* (2013.01);
(Continued)

(58) Field of Classification Search
CPC .. G02B 6/4482; G02B 6/3893; G02B 6/3895; G02B 6/43; G02B 6/443; G02B 6/447;
(Continued)

(56) References Cited

U.S. PATENT DOCUMENTS

| 3,942,859 A | 3/1976 | Korodi |
| 4,179,187 A | 12/1979 | Maurer |

(Continued)

FOREIGN PATENT DOCUMENTS

| CN | 200941319 Y | 8/2007 |
| CN | 201419706 Y | 3/2010 |

(Continued)

OTHER PUBLICATIONS http://www.dexim.net/list.php?id=7, Dexim product reference, downloaded from the web Feb. 24, 2016. 2 pages.

(Continued)

*Primary Examiner* — Jerry Blevins
(74) *Attorney, Agent, or Firm* — Robert I. Branham

(57) ABSTRACT

A traceable cable assembly includes a traceable cable having at least one data transmission element, a jacket at least partially surrounding the data transmission element, and first and second tracing optical fibers extending along at least a portion of a length of the traceable cable. The traceable cable assembly also includes a connector provided at each end of the traceable cable. The first and second tracing optical fibers each have a light launch end and a light emission end. The light launch ends of the first and second tracing optical fibers each include a bend. The bend allows for launching of light into the light launch ends without disengaging the first or second connectors from corresponding connector receptacles.

16 Claims, 15 Drawing Sheets

(51) Int. Cl.
  *G02B 6/38* (2006.01)
  *G02B 6/43* (2006.01)
  *H01R 13/717* (2006.01)

(52) U.S. Cl.
  CPC .............. *G02B 6/43* (2013.01); *G02B 6/443* (2013.01); *G02B 6/447* (2013.01); *G02B 6/4416* (2013.01); *G02B 6/4452* (2013.01); *H01R 13/7172* (2013.01)

(58) Field of Classification Search
  CPC . G02B 6/4416; G02B 6/4452; H01R 13/7172
  USPC ......................................................... 385/89
  See application file for complete search history.

(56) References Cited

U.S. PATENT DOCUMENTS

| | | | |
|---|---|---|---|
| 4,412,936 A | 11/1983 | Khmelkov et al. | |
| 4,466,697 A | 8/1984 | Daniel | |
| 4,557,552 A | 12/1985 | Newton et al. | |
| 4,637,686 A | 1/1987 | Iwamoto et al. | |
| 4,755,018 A | 7/1988 | Heng et al. | |
| 4,763,984 A | 8/1988 | Awai et al. | |
| 4,923,274 A | 5/1990 | Dean | |
| 4,995,691 A | 2/1991 | Purcell, Jr. | |
| 5,006,806 A | 4/1991 | Rippingale et al. | |
| 5,017,873 A | 5/1991 | Rippingale et al. | |
| 5,040,867 A | 8/1991 | de Jong et al. | |
| 5,122,750 A | 6/1992 | Rippingale et al. | |
| 5,179,611 A | 1/1993 | Umeda et al. | |
| 5,206,065 A | 4/1993 | Rippingale et al. | |
| 5,305,405 A | 4/1994 | Emmons et al. | |
| 5,329,348 A | 7/1994 | Nimura et al. | |
| 5,333,228 A | 7/1994 | Kingstone | |
| 5,377,292 A | 12/1994 | Bartling et al. | |
| 5,394,496 A | 2/1995 | Caldwell et al. | |
| 5,395,362 A | 3/1995 | Sacharoff et al. | |
| 5,432,876 A | 7/1995 | Appeldorn et al. | |
| 5,463,706 A | 10/1995 | Dumont et al. | |
| 5,500,913 A | 3/1996 | Allen et al. | |
| 5,591,160 A | 1/1997 | Reynard | |
| 5,615,295 A | 3/1997 | Yoshida et al. | |
| 5,651,080 A | 7/1997 | Chu et al. | |
| 5,666,453 A | 9/1997 | Dannenmann | |
| 5,703,978 A | 12/1997 | Digiovanni et al. | |
| 5,708,740 A | 1/1998 | Cullen | |
| 5,741,152 A | 4/1998 | Boutros | |
| 5,764,043 A | 6/1998 | Czosnowski et al. | |
| 5,835,654 A | 11/1998 | Bergmann | |
| 5,982,967 A | 11/1999 | Mathis et al. | |
| 6,126,325 A | 10/2000 | Yamane et al. | |
| 6,137,928 A | 10/2000 | Albrecht | |
| 6,137,935 A | 10/2000 | Bohme et al. | |
| 6,173,097 B1 | 1/2001 | Throckmorton et al. | |
| 6,257,750 B1 | 7/2001 | Strasser et al. | |
| 6,293,081 B1 | 9/2001 | Grulick et al. | |
| 6,301,418 B1 | 10/2001 | Freier et al. | |
| 6,311,000 B1 | 10/2001 | Schneider | |
| 6,314,713 B1 | 11/2001 | Fitz et al. | |
| 6,317,553 B1 | 11/2001 | Harper, Jr. et al. | |
| 6,347,172 B1 | 2/2002 | Keller et al. | |
| 6,356,690 B1 | 3/2002 | McAlpine et al. | |
| 6,379,054 B2 | 4/2002 | Throckmorton et al. | |
| 6,388,194 B1 | 5/2002 | Ryeczek | |
| 6,403,947 B1 | 6/2002 | Hoyt et al. | |
| 6,415,079 B1 | 7/2002 | Burdge et al. | |
| 6,425,694 B1 | 7/2002 | Szilagyi et al. | |
| 6,439,780 B1 | 8/2002 | Mudd et al. | |
| 6,456,768 B1 | 9/2002 | Boncek et al. | |
| 6,456,785 B1 | 9/2002 | Evans | |
| 6,471,412 B1 | 10/2002 | Belenkiy et al. | |
| 6,519,396 B2 | 2/2003 | Schneider et al. | |
| 6,526,200 B1 | 2/2003 | Davie | |
| 6,532,328 B1 * | 3/2003 | Kline ................... | G02B 6/4482 385/101 |
| 6,554,485 B1 | 4/2003 | Beatty et al. | |
| 6,560,390 B2 | 5/2003 | Grulick et al. | |
| 6,577,243 B1 | 6/2003 | Dannenmann et al. | |
| 6,596,943 B1 | 7/2003 | Ward | |
| 6,606,431 B2 | 8/2003 | Unsworth | |
| 6,678,449 B2 | 1/2004 | Thompson et al. | |
| 6,695,491 B1 | 2/2004 | Leeman et al. | |
| 6,710,254 B2 | 3/2004 | Yueh | |
| 6,712,524 B2 | 3/2004 | Beatty et al. | |
| 6,728,453 B2 | 4/2004 | Petryszak | |
| 6,798,956 B2 | 9/2004 | Morrison | |
| 6,816,661 B1 | 11/2004 | Barnes et al. | |
| 6,823,120 B2 | 11/2004 | Hurley et al. | |
| 6,906,505 B2 | 6/2005 | Brunet et al. | |
| 6,933,438 B1 | 8/2005 | Watts et al. | |
| 6,969,273 B2 | 11/2005 | Chen | |
| 6,979,223 B2 | 12/2005 | Chen | |
| 7,020,369 B2 | 3/2006 | Lodge, Jr. et al. | |
| 7,029,137 B2 | 4/2006 | Lionetti et al. | |
| 7,038,135 B1 | 5/2006 | Chan et al. | |
| 7,049,937 B1 | 5/2006 | Zweig et al. | |
| 7,090,411 B2 | 8/2006 | Brown | |
| 7,121,707 B2 | 10/2006 | Currie et al. | |
| 7,164,819 B2 | 1/2007 | Jenson et al. | |
| 7,217,152 B1 | 5/2007 | Xin et al. | |
| 7,221,284 B2 | 5/2007 | Scherer et al. | |
| 7,242,831 B2 | 7/2007 | Fee | |
| 7,313,304 B2 | 12/2007 | Andrews et al. | |
| 7,401,961 B2 | 7/2008 | Longatti et al. | |
| 7,406,231 B1 | 7/2008 | Beck et al. | |
| 7,433,565 B2 | 10/2008 | Joseph et al. | |
| 7,524,082 B2 | 4/2009 | North | |
| 7,544,909 B2 | 6/2009 | Dhir | |
| 7,572,066 B2 | 8/2009 | De Jong et al. | |
| 7,596,293 B2 | 9/2009 | Isenhour et al. | |
| 7,603,020 B1 | 10/2009 | Wakileh et al. | |
| 7,618,175 B1 | 11/2009 | Hulse | |
| 7,653,277 B2 | 1/2010 | Andrews et al. | |
| 7,671,279 B2 | 3/2010 | Yin | |
| 7,748,860 B2 | 7/2010 | Brunet | |
| 7,817,884 B2 | 10/2010 | Demeritt et al. | |
| 7,920,764 B2 | 4/2011 | Kewitsch | |
| 7,932,805 B2 | 4/2011 | Darr et al. | |
| 7,948,226 B2 | 5/2011 | Rathbun, II et al. | |
| 8,000,576 B2 | 8/2011 | Chen et al. | |
| 8,102,169 B2 | 1/2012 | Law et al. | |
| 8,150,227 B2 | 4/2012 | Kewitsch | |
| 8,167,471 B1 | 5/2012 | Moritz | |
| 8,152,385 B2 | 10/2012 | De Jong et al. | |
| 8,314,603 B2 | 11/2012 | Russell | |
| 8,322,871 B1 | 12/2012 | Knaggs et al. | |
| 8,331,752 B2 | 12/2012 | Biribuze et al. | |
| 8,408,029 B2 | 4/2013 | De Angelis et al. | |
| 8,414,319 B2 | 4/2013 | Patel et al. | |
| 8,428,405 B2 | 4/2013 | Kewitsch | |
| 8,492,448 B2 | 7/2013 | Dewa et al. | |
| 8,509,579 B2 | 8/2013 | Martin-Lopez | |
| 8,545,076 B2 | 10/2013 | Bickham et al. | |
| 8,548,293 B2 | 10/2013 | Kachmar | |
| 8,582,939 B2 | 11/2013 | Gimblet et al. | |
| 8,582,940 B2 | 11/2013 | Abernathy et al. | |
| 8,591,087 B2 | 11/2013 | Bickham et al. | |
| 8,620,123 B2 | 12/2013 | Dean, Jr. et al. | |
| 8,620,125 B2 | 12/2013 | Button et al. | |
| 8,683,827 B2 | 4/2014 | De Angelis et al. | |
| 8,708,724 B2 | 4/2014 | Patel et al. | |
| 8,724,942 B2 | 5/2014 | Logunov et al. | |
| 8,770,525 B2 | 7/2014 | Donaldson et al. | |
| 8,787,717 B2 | 7/2014 | Logunov | |
| 8,791,829 B2 | 7/2014 | Gustafsson et al. | |
| 8,798,419 B2 | 8/2014 | Wessels, Jr. et al. | |
| 8,805,141 B2 | 8/2014 | Fewkes et al. | |
| 8,896,286 B2 | 11/2014 | Abuelsaad et al. | |
| 8,896,287 B2 | 11/2014 | Abuelsaad et al. | |
| 8,897,612 B2 | 11/2014 | Logunov | |
| 8,903,212 B2 | 12/2014 | Kachmar | |
| 8,909,013 B1 | 12/2014 | Jiang et al. | |
| 8,929,703 B2 | 1/2015 | Logunov et al. | |
| 9,025,923 B2 | 5/2015 | Logunov et al. | |

(56) References Cited

U.S. PATENT DOCUMENTS

| | | |
|---|---|---|
| 9,073,243 B2 | 7/2015 | Gimblet et al. |
| 9,146,347 B2 | 9/2015 | Logunov et al. |
| 9,182,561 B2 | 11/2015 | Bauco et al. |
| 9,196,975 B2 | 11/2015 | Scherer et al. |
| 9,271,709 B2 | 3/2016 | Grey et al. |
| 9,304,278 B1 | 4/2016 | Bauco et al. |
| 9,388,975 B2 | 7/2016 | Wenger |
| 9,429,731 B2 | 8/2016 | Bookbinder et al. |
| 9,435,713 B2 | 9/2016 | Collier et al. |
| 9,448,380 B2 | 9/2016 | Mogensen |
| 9,507,096 B2 | 11/2016 | Isenhour et al. |
| 9,529,167 B2 | 12/2016 | Wu |
| 9,541,694 B2 | 1/2017 | Tissot |
| 9,709,750 B1 | 7/2017 | Kuang et al. |
| 2001/0002220 A1 | 5/2001 | Throckmorton et al. |
| 2001/0048797 A1 | 12/2001 | Van Dijk et al. |
| 2002/0009282 A1 | 1/2002 | Grulick et al. |
| 2002/0036775 A1 | 3/2002 | Wolleschensky et al. |
| 2002/0037133 A1 | 3/2002 | Unsworth |
| 2002/0136497 A1 | 9/2002 | McGarry et al. |
| 2002/0185299 A1 | 12/2002 | Giebel |
| 2003/0002830 A1 | 1/2003 | Petryszak |
| 2003/0016924 A1 | 1/2003 | Thompson et al. |
| 2003/0108270 A1 | 6/2003 | Brimacombe et al. |
| 2003/0206519 A1 | 11/2003 | Sanders et al. |
| 2003/0222786 A1 | 12/2003 | Dannenmann et al. |
| 2004/0022504 A1 | 2/2004 | Hurley et al. |
| 2004/0052473 A1 | 3/2004 | Seo et al. |
| 2004/0146254 A1 | 7/2004 | Morrison |
| 2004/0160774 A1 | 8/2004 | Lionetti et al. |
| 2004/0179777 A1 | 9/2004 | Buelow, II et al. |
| 2004/0196648 A1 | 10/2004 | Franklin et al. |
| 2005/0052174 A1 | 3/2005 | Angelo et al. |
| 2005/0089284 A1 | 4/2005 | Ma |
| 2005/0212503 A1 | 9/2005 | Deibele |
| 2006/0104578 A1 | 5/2006 | Herbst |
| 2006/0133750 A1 | 6/2006 | Lee |
| 2006/0140562 A1 | 6/2006 | Joseph et al. |
| 2006/0193575 A1 | 8/2006 | Greenwood et al. |
| 2006/0232385 A1 | 10/2006 | Scherer et al. |
| 2006/0285350 A1 | 12/2006 | Wang |
| 2007/0071389 A1 | 3/2007 | Yoon et al. |
| 2007/0116402 A1 | 5/2007 | Slade et al. |
| 2007/0153508 A1 | 7/2007 | Nall et al. |
| 2007/0217749 A1 | 9/2007 | Jong et al. |
| 2008/0080820 A1 | 4/2008 | Andrews et al. |
| 2008/0087082 A1 | 4/2008 | Andrews et al. |
| 2008/0121171 A1 | 5/2008 | Hulsey |
| 2008/0198618 A1 | 8/2008 | North |
| 2008/0204235 A1 | 8/2008 | Cook |
| 2008/0273844 A1 | 11/2008 | Kewitsch |
| 2009/0027873 A1 | 1/2009 | Tarlton |
| 2009/0297104 A1 | 12/2009 | Kachmar |
| 2009/0299440 A9 | 12/2009 | Slatkine |
| 2010/0021114 A1 | 1/2010 | Chen et al. |
| 2010/0148747 A1 | 6/2010 | Rathbun, II et al. |
| 2010/0166374 A1 | 7/2010 | Lapp |
| 2010/0274235 A1* | 10/2010 | Mihajlovic ........... A61B 5/0084 606/15 |
| 2011/0034068 A1 | 2/2011 | Russell |
| 2011/0085776 A1 | 4/2011 | Biribuze et al. |
| 2011/0103747 A1 | 5/2011 | Chang et al. |
| 2011/0103757 A1 | 5/2011 | Alkemper et al. |
| 2011/0122646 A1 | 5/2011 | Bickham et al. |
| 2011/0150488 A1 | 6/2011 | Kewitsch |
| 2011/0305035 A1 | 12/2011 | Bickham et al. |
| 2012/0019900 A1 | 1/2012 | Kitson et al. |
| 2012/0219259 A1 | 8/2012 | Kewitsch |
| 2012/0275178 A1 | 11/2012 | Logunov |
| 2012/0275180 A1 | 11/2012 | Button et al. |
| 2012/0275745 A1 | 11/2012 | Logunov |
| 2013/0021597 A1 | 1/2013 | Carlson, Jr. et al. |
| 2013/0088888 A1 | 4/2013 | Fewkes et al. |
| 2013/0107565 A1 | 5/2013 | Genier |
| 2013/0201001 A1 | 8/2013 | Ratnakar |
| 2013/0209045 A1* | 8/2013 | Dean, Jr. ............ G02B 6/02033 385/113 |
| 2013/0272014 A1 | 10/2013 | Logunov et al. |
| 2013/0341922 A1 | 12/2013 | Jimenez Buendia |
| 2013/0343703 A1 | 12/2013 | Genier |
| 2014/0016904 A1 | 1/2014 | Kachmar |
| 2014/0070639 A1 | 3/2014 | Tamura |
| 2014/0221763 A1 | 8/2014 | Vayser et al. |
| 2014/0227438 A1 | 8/2014 | Dean, Jr. et al. |
| 2014/0270639 A1 | 9/2014 | James, III et al. |
| 2014/0355295 A1 | 12/2014 | Kuchinsky et al. |
| 2014/0363134 A1 | 12/2014 | Bookbinder et al. |
| 2015/0043875 A1 | 2/2015 | Bookbinder et al. |
| 2015/0049992 A1 | 2/2015 | Bauco |
| 2015/0369986 A1 | 12/2015 | Logunov et al. |
| 2016/0139353 A1 | 5/2016 | Bauco et al. |
| 2016/0202418 A1 | 7/2016 | Fortin et al. |
| 2016/0231521 A1 | 8/2016 | Smith et al. |
| 2016/0313483 A1 | 10/2016 | Chomycz |
| 2016/0313513 A1 | 10/2016 | Wijbrans et al. |
| 2016/0377818 A1 | 12/2016 | Tong et al. |
| 2017/0207585 A1 | 7/2017 | Butler et al. |
| 2018/0128996 A1 | 5/2018 | Sawicki et al. |

FOREIGN PATENT DOCUMENTS

| | | |
|---|---|---|
| CN | 102589728 A | 7/2012 |
| CN | 201305952 U | 7/2012 |
| CN | 203241575 U | 10/2013 |
| DE | 4413597 A1 | 10/1995 |
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 0874191 A2 | 10/1998 |
| EP | 0952589 A2 | 10/1999 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 59182404 A | 4/1983 |
| JP | 61139221 A | 6/1986 |
| JP | 61161827 U | 10/1986 |
| JP | 1990055506 A | 2/1990 |
| JP | 2108007 A | 4/1990 |
| JP | 2108008 A | 4/1990 |
| JP | 6017157 U | 3/1994 |
| JP | 06130253 A | 5/1994 |
| JP | 9178956 A | 7/1997 |
| JP | 9237524 A | 9/1997 |
| JP | 2008153030 A | 7/2008 |
| JP | 2009244288 A | 10/2009 |
| JP | 2010237233 A | 10/2010 |
| JP | 2013196960 A | 9/2013 |
| KR | 875507 B1 | 12/2008 |
| WO | 1998034144 A1 | 8/1998 |
| WO | 1999024856 A1 | 5/1999 |
| WO | 2000011484 A1 | 3/2000 |
| WO | 2005106899 A1 | 11/2005 |
| WO | 2006044177 A2 | 4/2006 |
| WO | 2006113114 A2 | 10/2006 |
| WO | 2007053371 A1 | 5/2007 |
| WO | 2008034955 A2 | 4/2008 |
| WO | 2010011299 A2 | 1/2010 |
| WO | 2010021896 A1 | 2/2010 |
| WO | 2011063214 A | 5/2011 |
| WO | 2013055842 A1 | 4/2013 |
| WO | 2013059811 A1 | 4/2013 |
| WO | 2013122825 A1 | 8/2013 |
| WO | 2014026300 A1 | 2/2014 |
| WO | 2015000194 A1 | 1/2015 |

OTHER PUBLICATIONS

Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.

(56) References Cited

OTHER PUBLICATIONS

Fiber Optic Products, Inc., "Specifications of our Fiber and Cable," n.d. Retrieved on Aug. 9, 2013, 2 pages.
M. Rajesh, "Polymer Photonics: An Overview," Fabrication and Characterisation, 2011, 38 pages.
Schott, "SpectraStream Glass Harnesses," Rev. 11/06, 2 pages.
Spigulis, J., "Side-Emitting Fibers Brighten Our World in New Ways," Oct. 2005, Retrieved from www.osa-opn.org, 6 pages.
Patent Cooperation Treaty, International Search Report, Application No. PCT/US2013/025262, dated Jul. 16, 2013, 7 pages.
U.S. Appl. No. 62/193,638, A. Bauco et al., "Systems and Methods for Traceable Cables," filed Jul. 17, 2015.
"Super Vision Fiber Optics Side Glow Cables," TriN01ihLighting.com, Tri North Lighting, Inc., n.d., Web. Aug. 1, 2013.
U.S. Appl. No. 13/431,565, filed Mar. 27, 2012, David L. Dean, Jr., 32 pages.
European Search Report, Application No. 15168466.9-1553, dated Dec. 17, 2015, 9 pages.
Optical fiber with nanostructured cladding of TiO2 nanoparticles self-assembled onto a side polished fiber and its temperature sensing, Lu et al., Optics Express, vol. 22, No. 26, Dec. 29, 2014, 7 pages, downloaded from internet on Jan. 5, 2015.
Patent Cooperation Treaty, International Search Report for PCT/US2015/060558, dated Feb. 9, 2016, 5 pages.
Patent Cooperation Treaty International Search Report, Application No. PCT/US2014/049524, dated Jan. 20, 2015, 5 pages.
"Diode Lasers, Fiber Optics, IR, Red, Green, Blue Diode Lasers, Laser Diode, Fiber Illuminators, Fiber Optics, Coupler, Galvonameters, Laser Show Acessories," Jan. 1, 2013, httn://www.meshtel.com/, 1 oage.
Patent Cooperation Treaty, International Search Report, PCT/US2014/049525, dated Jan. 23, 2015, 18 pages.
U.S. Appl. No. 14/295,844, Bookbinder filed on Jun. 4, 2014, 25 pages.
Patent Cooperation Treaty, International Search Report and Written Opinion for International Application No. PCT/US2014/041510, dated Sep. 18, 2014, 10 pages.
U.S. Appl. No. 14/791924, filed May 20, 2015.
U.S. Appl. No. 15/000,128, filed Jan. 19, 2016.
U.S. Appl. No. 15/054,380, filed Mar. 31, 2015.
U.S. Appl. No. 15/142,853, filed Apr. 29, 2016.
U.S. Appl. No. 62/193,638, filed Jul. 17, 2015.
U.S. Appl. No. 62/193,643, filed Jul. 17, 2015.
U.S. Appl. No. 62/221,769, filed Sep. 22, 2015.
U.S. Appl. No. 62/221,774, filed Sep. 22, 2015.
U.S. Appl. No. 62/248,490, filed Oct. 30, 2015.
International Search Report and Written Opinion PCT/US2016/020542 dated Jun. 7, 2016.
"Side Emitting Super Glowing Fiber." MeshTel.com. MeshTel-INTELITE, INC., 1996-2012. Web. Aug. 1, 2013.
European Search Report EP15168466 dated Dec. 17, 2015.
International Search Report and Written Opinion PCT/US2016/031624 dated Aug. 31, 2016.
International Search Report and Written Opinion PCT/US2016/042414 dated Oct. 5, 2016.
International Searching Authority Invitation to Pay Additional Search Fees PCT/US2016/042416 dated Oct. 7, 2016.
International Searching Authority Invitation to Pay Additional Fees PCT/US2016/055497 dated Dec. 19, 2016.
Endruweit et al. "Spectroscopic experiments regarding the efficiency of side emission optical fibres in the UV-A and visible blue spectrum", Optics and Lasers Engineering 46 (2008) pp. 97-105.
International Search Report and Written Opinion PCT/US2017/012899 dated Mar. 9, 2017.
U.S. Appl. No. 62/221,769, A. Bauco et al., "Systems and Methods for Traceable Cables," filed Sep. 22, 2015.

\* cited by examiner

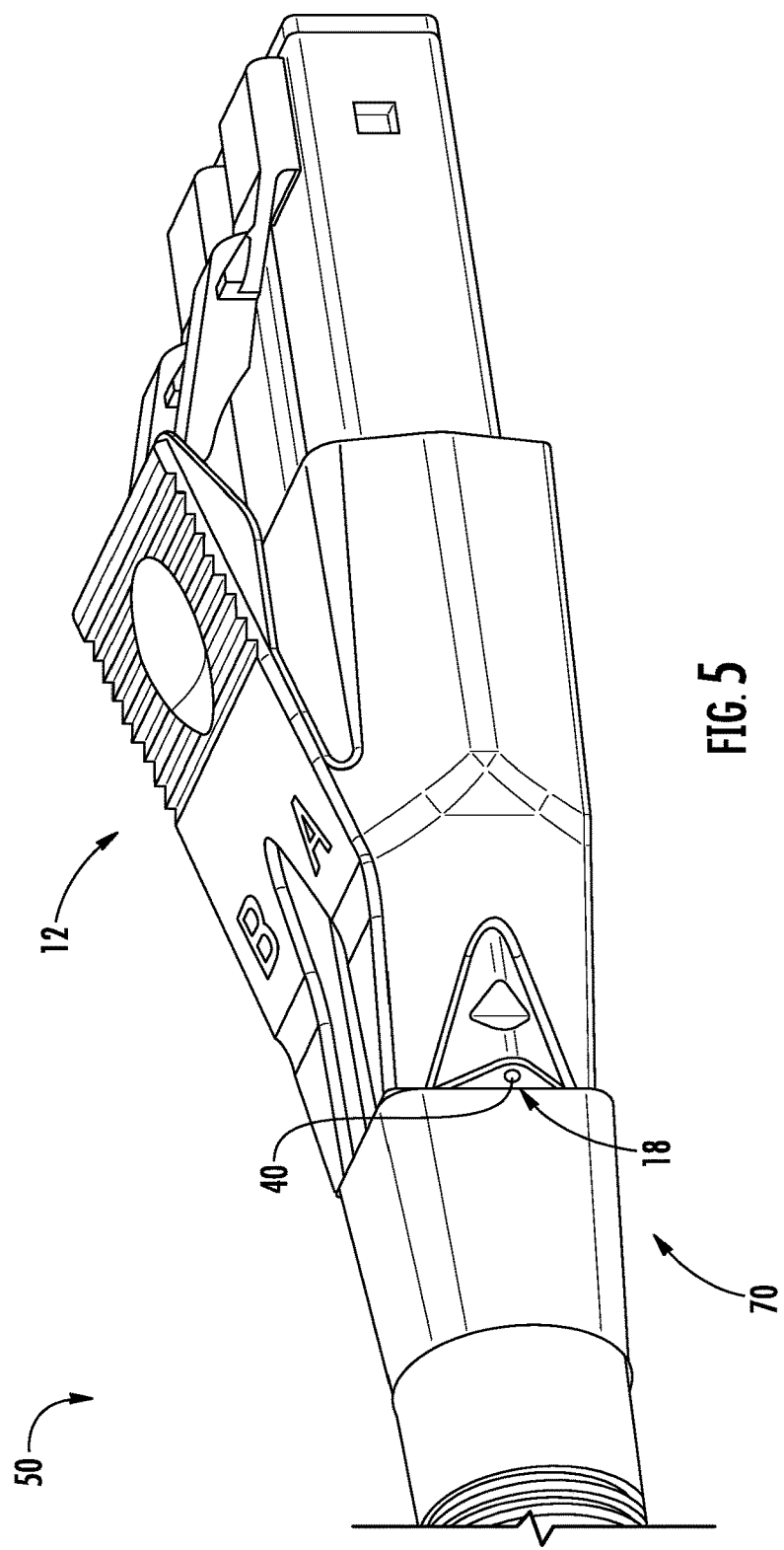

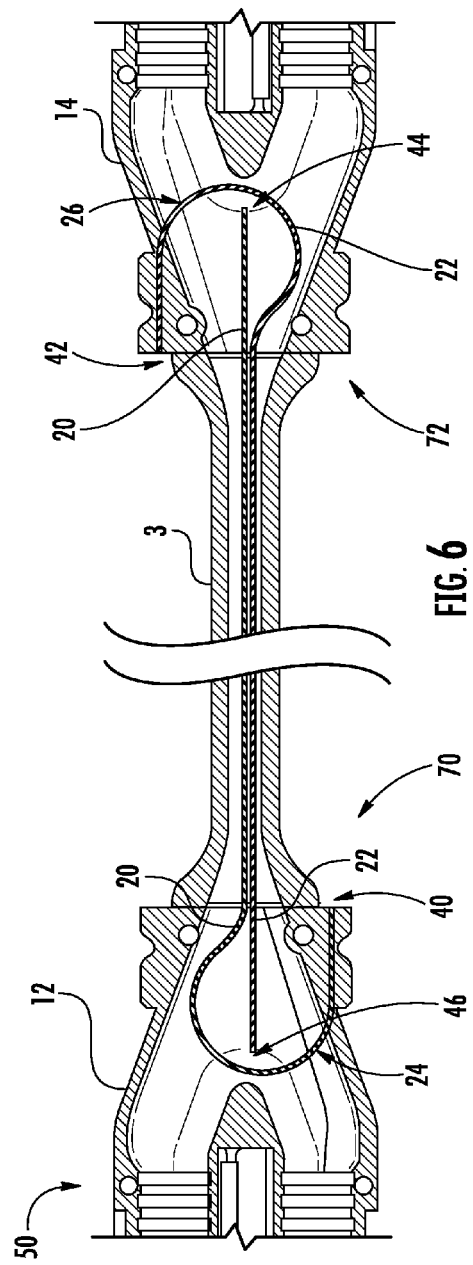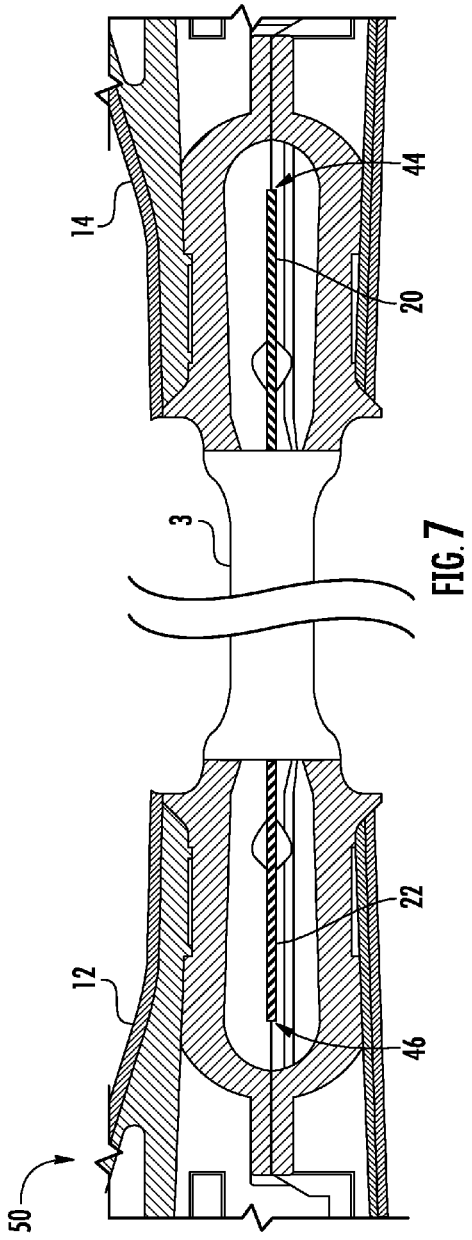

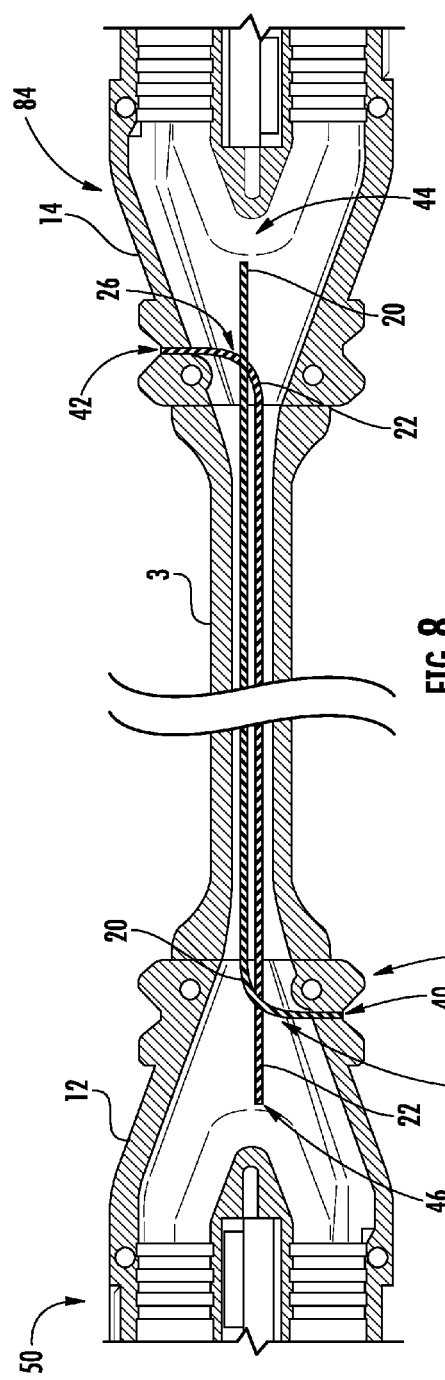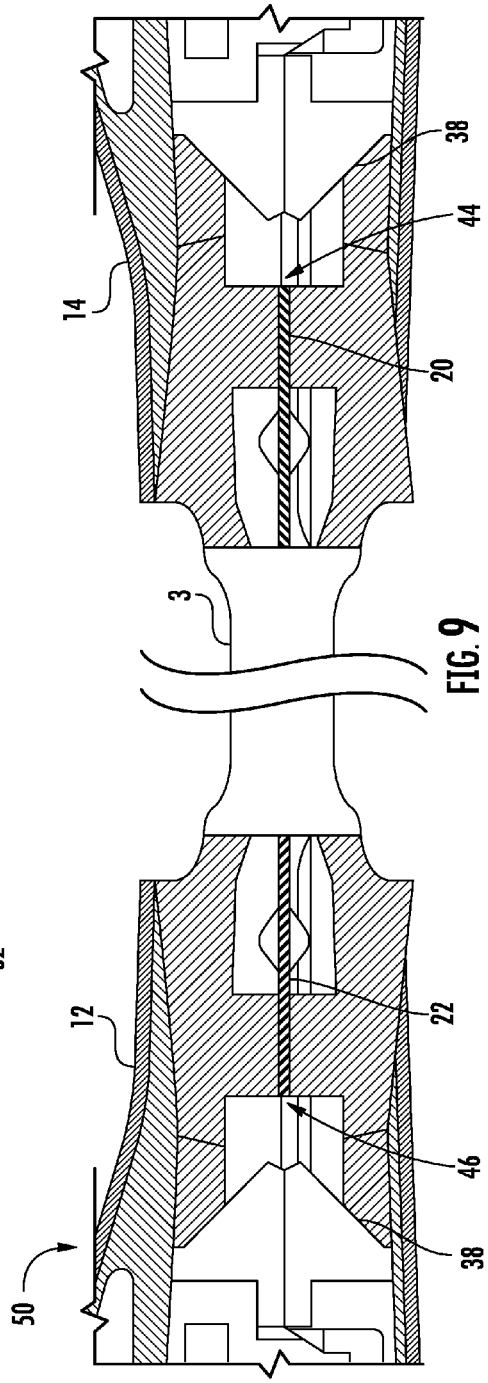

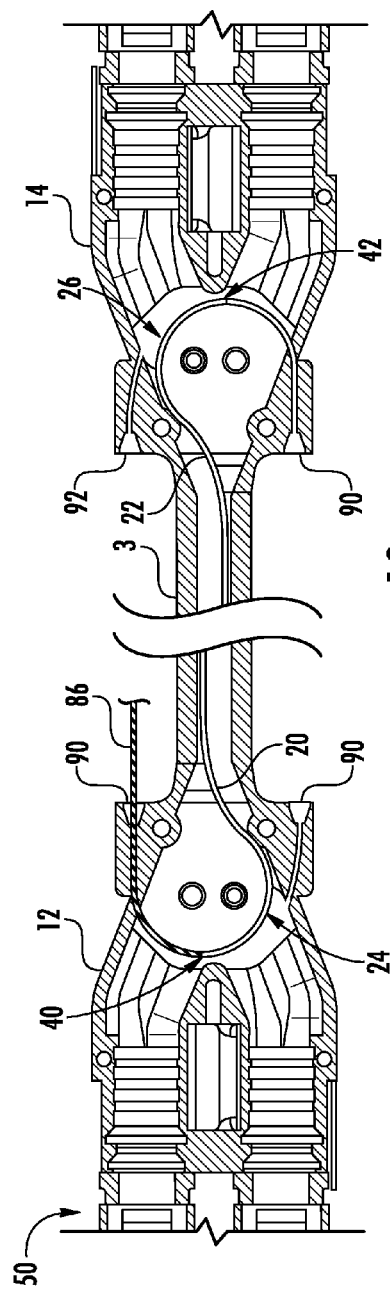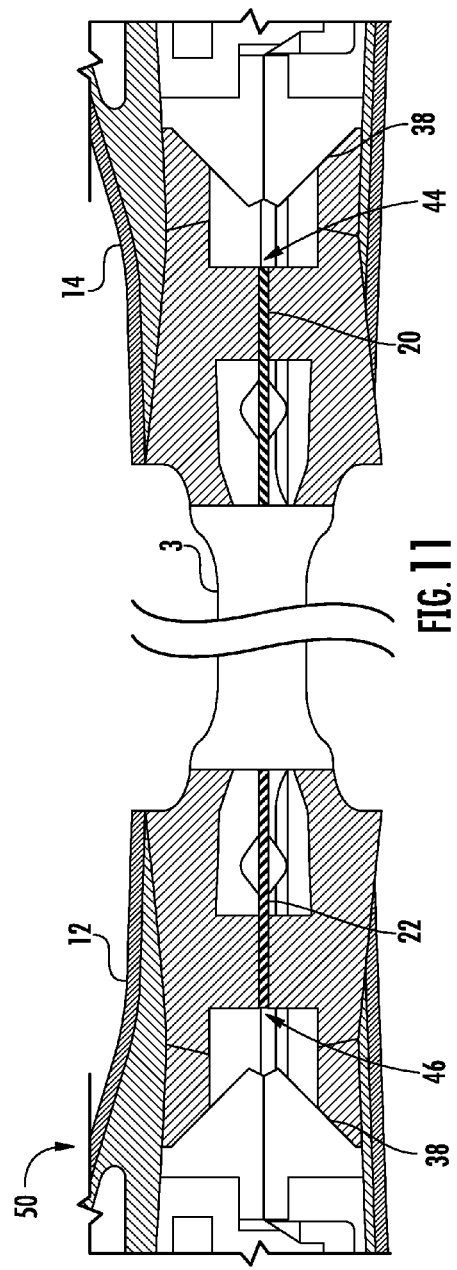

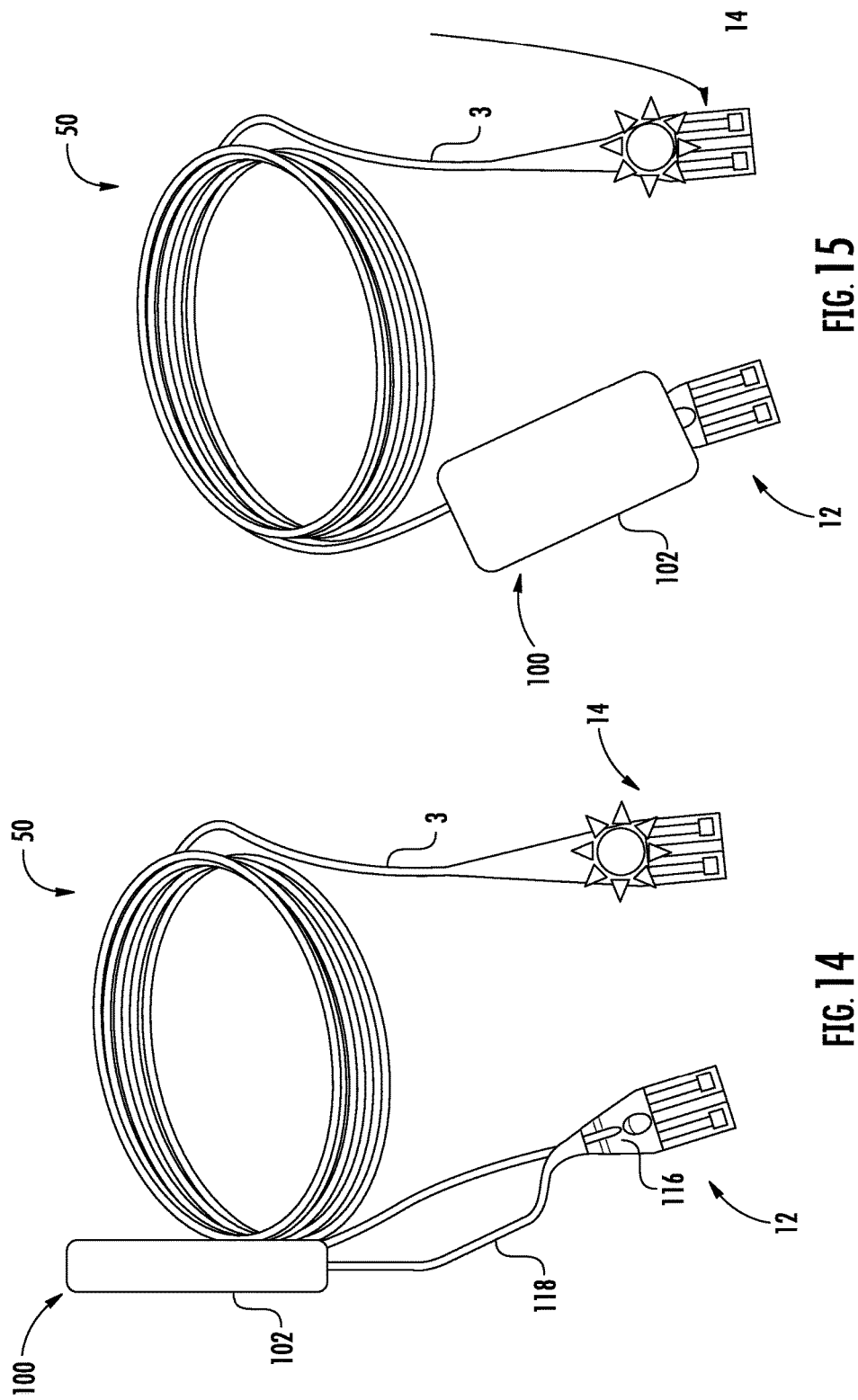

TRACEABLE END POINT CABLE ASSEMBLY

CROSS REFERENCE TO RELATED APPLICATIONS

This application claims the benefit of priority of U.S. Provisional Application Ser. No. 62/320,024, filed Apr. 8, 2016, the content of which is relied upon and incorporated herein by reference in its entirety.

BACKGROUND

This disclosure generally relates to fiber optic cable assemblies having tracing waveguides that facilitate location of the end points of the fiber optic cable assembly. More particularly, this disclosure relates to cable assemblies that are traceable due to the addition of one or more tracing optical fibers.

Today's computer networks continue to increase in size and complexity. Businesses and individuals rely on these networks to store, transmit, and receive critical data at high speeds. Even with the expansion of wireless technology, wired connections remain critical to the operation of computer networks, including enterprise data centers. Portions of these wired computer networks are regularly subject to removal, replacement, upgrade or other moves and changes. To ensure the continued proper operation of each network, the maze of cables connecting the individual components must be precisely understood and properly connected between specific ports.

In many cases, a network's cables, often called patch cords, can be required to bridge several meters across a data center. The cables may begin in one equipment rack, run through the floor or other conduit, and terminate at a component in a second equipment rack. As a result, there is a need for a traceable cable that allows a network operator to quickly identify the terminal end of a given cable that is being replaced, relocated, or tested.

This disclosure generally relates to traceable cable assemblies and systems. More particularly, the present disclosure relates to traceable cable assemblies and systems provided with one or more tracing optical fibers.

SUMMARY

The present disclosure describes traceable cable assemblies that include at least one tracing optical fiber to facilitate identification of a terminal end of the cable assembly. In use, a launch tool injects light into the tracing optical fiber at a first end of the cable assembly causing the opposite end of the cable assembly to illuminate. Such an assembly allows for accurate identification of corresponding ends of a cable assembly during a cable replacement, relocation and/or testing operation.

One embodiment of the present disclosure relates to a traceable cable assembly that includes a cable having at least one data transmission element, a jacket at least partially surrounding the data transmission element, a first tracing optical fiber extending along at least a portion of the length of the traceable cable, a second tracing optical fiber extending along the portion of a length of the traceable cable, a first connector provided at a first end of the traceable cable and a second connector provided at a second end of the traceable cable. The first tracing optical fiber includes a light launch end and a light emission end, and the light launch end includes a first bend that is equal to or greater than 90 degrees. The second tracing optical fiber includes a light launch end and a light emission end, and the light launch end includes a first bend that is equal to or greater than 90 degrees. The first tracing optical fiber facilitates identification of the second connector when a launch light is injected in the light launch end of the first tracing optical fiber. The second tracing optical fiber facilitates identification of the first connector when the launch light is injected in the light launch end of the second tracing optical fiber. Thus, both ends of the traceable cable assembly can be located by launching light into the opposite end of the cable.

Another embodiment of the present disclosure includes a method of forming a traceable cable system. The method includes forming a traceable cable by providing a data transmission element, a jacket at least partially surrounding the data transmission element, and first and second tracing optical fibers within the jacket so that the tracing optical fibers extend along at least a portion of a length of the traceable cable. The first tracing optical fiber includes a light launch end and a light emission end, and the light launch end includes a first bend that is equal to or greater than 90 degrees. Likewise, the second tracing optical fiber includes a light launch end and a light emission end, and the light launch end includes a first bend that is equal to or greater than 90 degrees. The first bend of the first tracing optical fiber is positioned opposite from the first bend of the second tracing optical fiber so that the light launch end of the first fiber is positioned at the same end of the cable as the light emission end of the second fiber, and vice versa. The method also includes securing a first connector to a first end of the traceable cable and securing a second connector to a second end of the traceable cable.

Yet another embodiment of the present disclosure relates to a traceable cable assembly that includes a traceable cable having at least one data transmission element, a jacket at least partially surrounding the data transmission element, a first tracing optical fiber extending along at least a portion of a length of the traceable cable, a second tracing optical fiber extending along a portion of the length of the traceable cable, a first connector provided at a first end of the traceable cable and a second connector provided at a second end of the traceable cable. The first tracing optical fiber includes a light launch end and a light emission end, and the light launch end includes a first bend that is equal to or greater than 90 degrees. The light emission end of the first tracing optical fiber also includes one or more diffusing elements. In some embodiments, the light emission end may also include one or more reflective elements or refractive elements. The second tracing optical fiber also includes a light launch end and a light emission end, and the light launch end includes a first bend that is equal to or greater than 90 degrees. The light emission end of the second tracing optical fiber also includes one or more diffusing elements. In some embodiments, the light emission end of the second tracing optical fiber may also include one or more reflective elements or refractive elements. The light launch end of the first tracing optical fiber is positioned on the traceable cable opposite from the light launch end of the second tracing optical fiber. In addition, the first bend of the first tracing optical fiber is located in the first connector and the first bend of the second tracing optical fiber is located in the second connector. The first tracing optical fiber facilitates identification of the second connector when a launch light is injected in the light launch end of the first tracing optical. Likewise, the second tracing optical fiber facilitates identification of the first connector when the launch light is injected in the light launch end of the second tracing optical fiber.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

FIG. 5 is a perspective view of a connector in accordance with an embodiment of the present disclosure.

FIG. 6 is a horizontal cross-section view of the connector of FIG. 5.

FIG. 7 is a vertical cross-section view of the connector of FIG. 5.

FIG. 8 is a horizontal cross-section view of another connector in accordance with an embodiment of the present disclosure.

FIG. 9 is a vertical cross-section view of the connector of FIG. 8.

FIG. 10 is a horizontal cross-section view of another connector in accordance with an embodiment of the present disclosure.

FIG. 11 is a vertical cross-section view of the connector of FIG. 10.

FIG. 14 is a schematic illustration of an embodiment of a launch tool for injecting light into a light launch end of a tracing optical fiber in accordance with an embodiment of the present disclosure.

FIG. 15 is a schematic illustration of another embodiment of a launch tool for injecting light into a light launch end of a tracing optical fiber in accordance with an embodiment of the present disclosure.

DESCRIPTION

Various embodiments will be further clarified by examples in the description below. In general, the description relates to cable assemblies that use tracing waveguides to facilitate the traceability of the ends of a cable assembly. This description also relates to methods of forming traceable cable assemblies.

Figure 1:
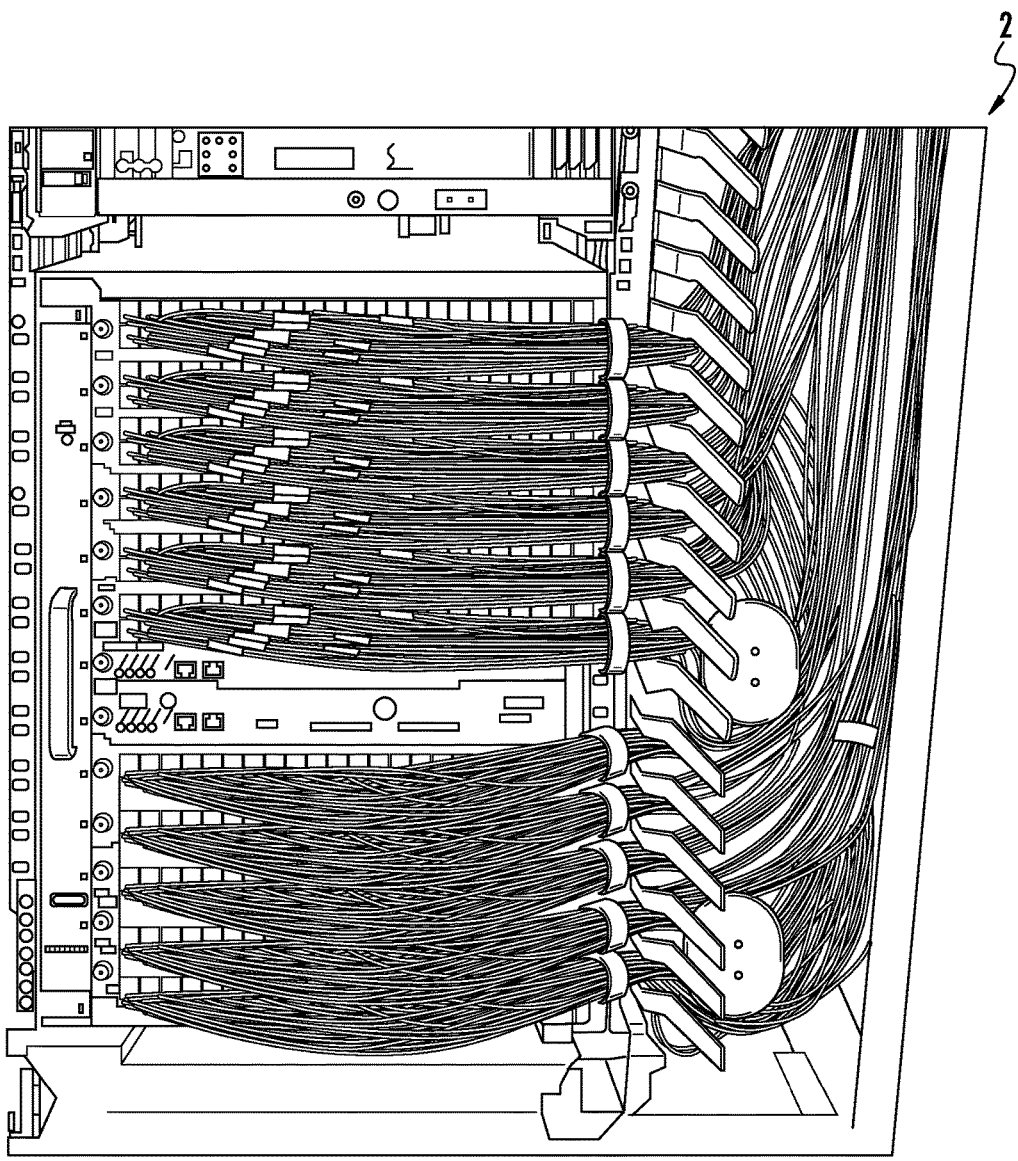
FIG. 1 is a perspective view of an equipment rack supporting patch cords.
Figure 2:
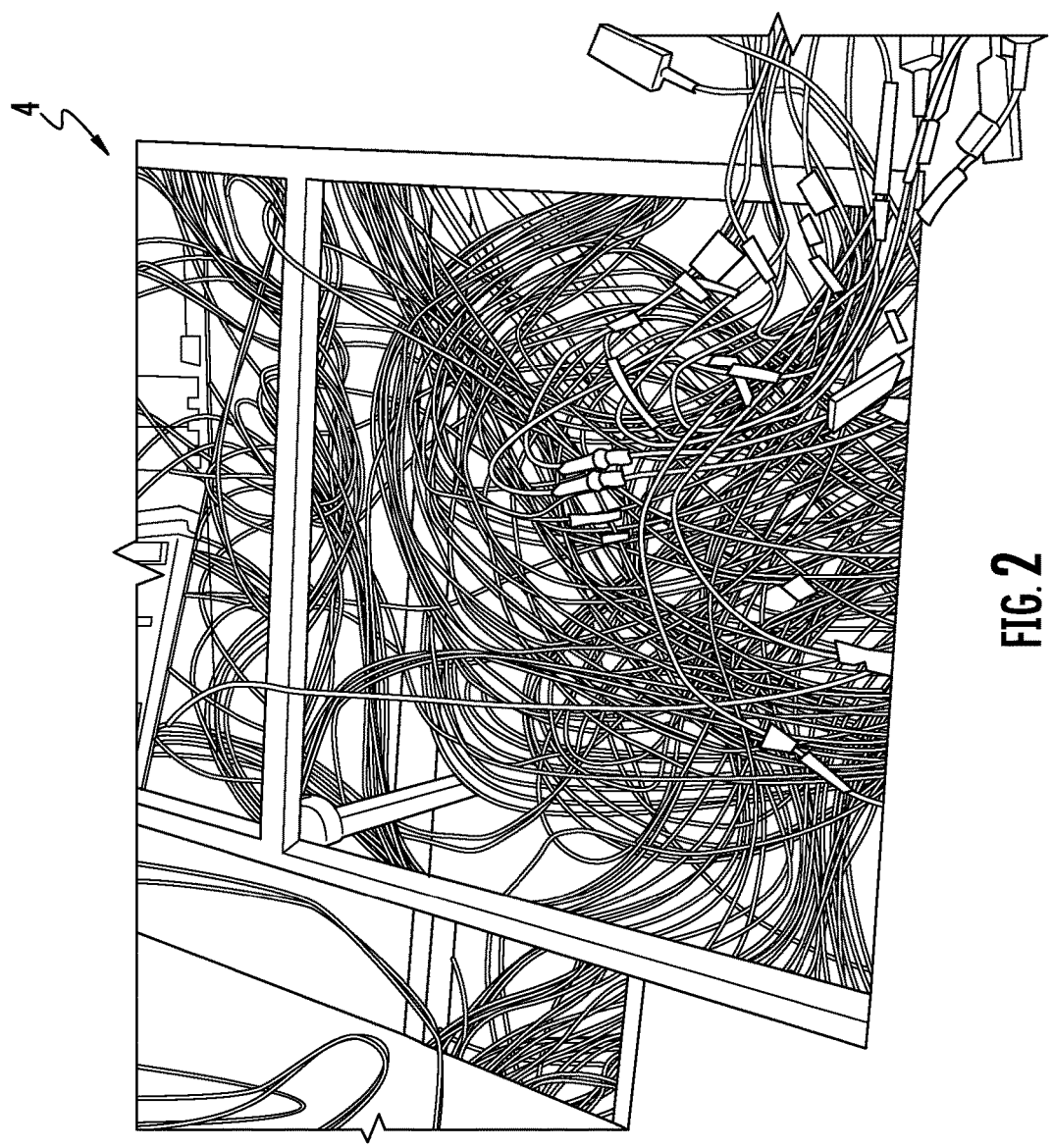
FIG. 2 is a perspective view of an under-floor cable tray supporting patch cords.

A problem that occurs in data centers or similar network locations is congestion and clutter caused by large quantities of cables. FIG. 1 shows an example of congestion in an equipment rack 2. FIG. 2 shows congestion in an under-floor cable tray 4. Network operators frequently need to change connections to accommodate moves, adds, and changes in the network. However, operators find it difficult to trace a particular cable from the source to the receiver when the network location is congested, as illustrated in FIGS. 1 and 2.

The various embodiments described herein may be incorporated into a tracing system that makes the process of performing a trace or otherwise identifying a cable in a congested environment relatively convenient and fast for a technician. As a result, the technician can reliably identify the cable in question (which may be a telecommunication patch cord) from amongst many other cables (which may also be telecommunication patch cords). The tracing system may also have the advantage of being an optically-activated tracing system using only passive tracing elements associated with the cable (although active tracing elements may still be provided in addition to the passive tracing elements, if desired). An aspect of this disclosure is the provision of one or more tracing optical fibers within a traceable cable to provide for traceablility of the cable from one or both the ends of the cable. Yet another aspect of this disclosure is the ability to trace a cable without disconnecting the cable from corresponding receptacles. Another aspect of this disclosure is the efficient manufacture of such traceable cable assemblies. Various embodiments will be further clarified by examples in the description below.

Figure 3:
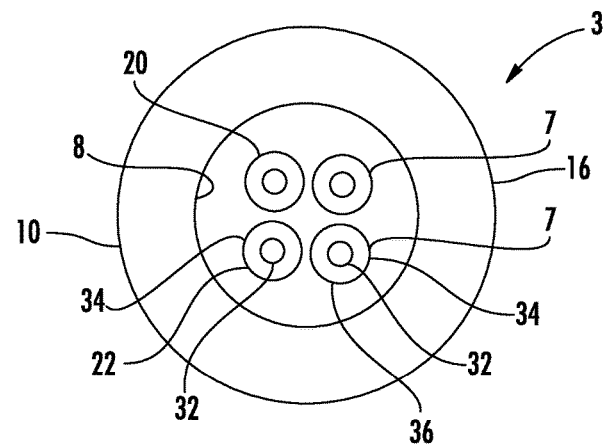
FIG. 3 is a cross-sectional view of the cable according to an embodiment of the present disclosure.

FIG. 3 illustrates a cross section of a cable 3 representing one possible embodiment. The cable 3 may include one or more data transmission elements 7. Two such data transmission elements 7 are shown in FIG. 3, but the cable 3 may include any number of data transmission elements 7.

The data transmission elements 7 may be of the same type or different types as compared to one another. Generally, a data transmission element 7 is a structure capable of carrying a data signal from one end of the cable 3 to the other. The data transmission element 7 may be configured to transmit an electrical signal, for example, using a copper wire or other electrically conductive material. Alternatively, or in addition, the data transmission element 7 may be configured to transmit an optical signal by conducting electromagnetic waves such as ultraviolet, infrared, or visible light to carry data from one location to another. The data transmission elements 7 shown in FIG. 3 are of the latter type (i.e., an optical transmission element) having a core 32 and a cladding 34. There may be strength members (e.g., aramid yarns) or other elements located within the cable 3 between the data transmission elements 7 and the jacket 10.

In yet other embodiments, the cable 3 may be more appropriately referred to as a conduit, without having any data transmission elements 7. For example, the cable 3 may transmit fluids such as air or liquid and may be appropriate for use in a medical setting such as IV lines or oxygen tubing.

The cable 3 includes a jacket 10. The jacket 10 may be a hollow tube forming a conduit 8 that substantially surrounds the data transmission elements 7 and defines an outer surface of the cable 3. Alternatively, the data transmission elements 7 may be only partially embedded within the jacket 10.

Cables 3 of the present disclosure also include one or more tracer elements, such as tracing optical fibers 20, 22. The tracer elements are provided to enable an operator to identify the cable 3 at one end by injecting light into the opposite end of the cable 3. In some embodiments, the operator can visually identify the tracer elements with or without special equipment, such as an IR camera. The tracer elements of FIG. 3 are shown in the form of tracing optical fibers 20, 22 configured to transmit and emit tracer light for visualization purposes.

The tracing optical fibers 20, 22 may be incorporated as part of the cable 3 in several configurations. For example, in the embodiment shown in FIG. 3 the tracing optical fibers 20, 22 are adjacent to the data transmission elements 7 inside the conduit 8 defined by the jacket 30. In yet other embodiments, the tracing optical fiber 20, 22 may be mounted to an outer surface 16 of the jacket 10 or otherwise attached to the jacket 10. In other embodiments, the tracing optical fiber 20, 22 may be incorporated within the jacket 10.

As noted above, one example of tracer elements is the tracing optical fibers 20, 22. The tracing optical fibers 20, 22 may be referred to interchangeably as optical waveguides herein. Therefore this disclosure does not intend to differentiate between the terms "optical fiber" and "optical waveguide" per se. The optical fibers 20, 22 may conduct nonvisible light or visible light, such as green light at approximately 532 nm. Red light, blue light, or a combination thereof could also be used to assist with tracing the cable 3. Green light may be used due to the relative high degree of sensitivity of the human eye to green light.

In some embodiments, the optical fibers 20, 22 each include a core 32 and a cladding 34. The core 32 may be made from glass, particularly silica-based glass, having a first index of refraction. Alternatively, the core 32 may be formed from a polymer. The size of the core 32 is not particularly limited, but in some embodiments diameters may be between about 100 microns and about 250 microns. The core 32 may be, for example, 125 microns. Cores 32 that are significantly smaller may be subject to damage from handling, and cores 32 that are significantly larger may be subject to damage when bending.

The cladding 34 can be made from glass or a polymer, such as fluoro-acrylate. The material for the cladding 34 may be selected to have an index of refraction that differs from the index of refraction of the core 32. In some embodiments, the index of refraction of the cladding 34 is lower than that of the core 32. The indices of refraction may produce a step-index tracing optical fiber 20, 22. In other embodiments, the optical fibers 20, 22 may be trapezium or triangular index fibers. The cladding 34 closely surrounds the core 32 to help maintain light within the tracing optical fibers 20, 22. The cladding 34 may have a thickness between about 4% and about 40% of the diameter of the core 30. For example, the cladding 34 may be between about 5 and about 50 microns thick from the surface of the core 32 to an exterior surface 36 of the cladding 34 when the core 32 has a diameter of 125 microns. The tracing optical fibers 20, 22 may be single mode fibers or multi-mode fibers.

Figure 4:
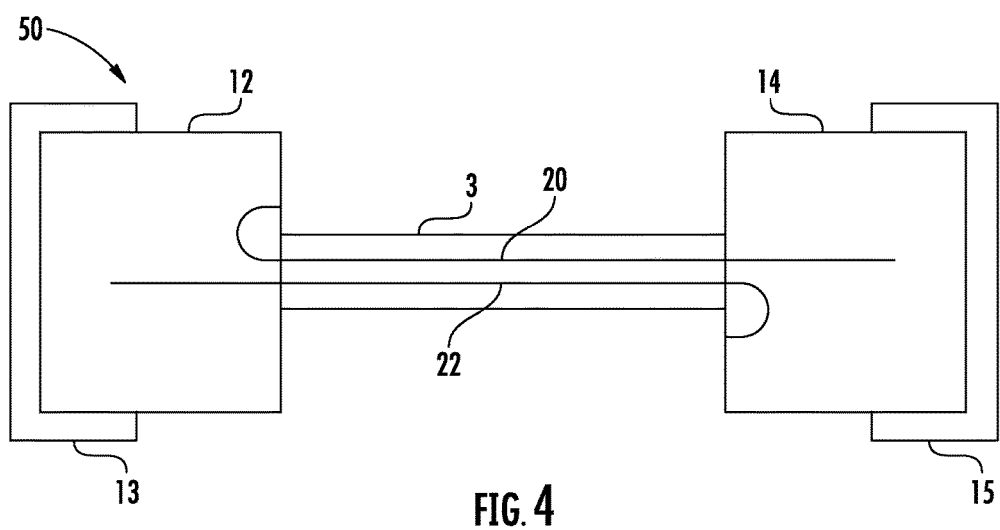
FIG. 4 is a schematic view of a traceable cable assembly according to an embodiment of the present disclosure.
Figure 12:
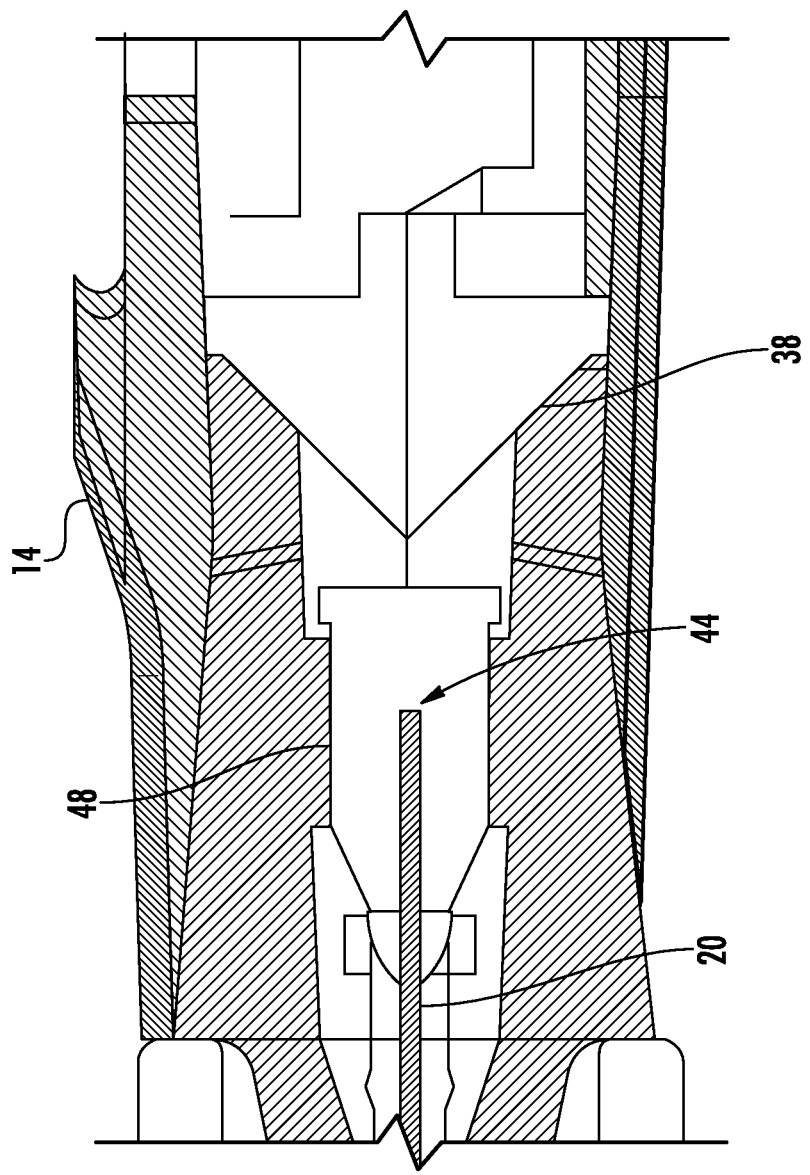
FIG. 12 is a vertical cross-section view of another connector in accordance with an embodiment of the present disclosure.

An example cable assembly 50 including the fiber 3 of FIG. 3 is schematically illustrated in FIG. 4. In general, the cable assembly includes a first connector 12, a second connector 14 and a cable 3 extending between the first and second connectors 12, 14. The cable 3 has at least one tracing optical fiber 20 or 22 to allow for accurate identification of an end of the cable assembly 50. In use, the traceable cable 3 may extend between two locations, such as two equipment racks in a data center, telecommunications room, or the like. The first and second connectors 12, 14 are present on opposite ends of the cable 3 to allow the cable assembly 50 to act as a patch cord between components of a network. The connectors 12, 14 may vary widely depending on the nature of the cable 3 and the components being connected. The specific type of connectors 12, 14 selected should match the port configuration of the network component and will vary based upon the quantity and type of signals being transmitted by the cable 3.

Example connectors for use in a cable assembly 50 of the present disclosure are illustrated in FIGS. 5-12. FIG. 5 illustrates a perspective view of a first connector 12 in accordance with the present disclosure. The connector 12 may be any suitable type of connector, such as, for example, a duplex LC fiber optic connector. In some embodiments, the connector 24 is configured to accept tracer light from a launch tool at location identified by numeral 18. The positioning of the light launch end 40 of the first tracing optical fiber 20 at location 18 allows a user to launch light into the connector 12 without disconnecting the connector 12 from a receptacle (see, e.g., receptacles 13, 15 in FIG. 4). The connector 12 may also include a light emission end 46 of a second tracing optical fiber 22 (FIGS. 6 and 7) that illuminates at least part of the connector 12 when light is injected into the light launch end 42 of the second tracing optical fiber 22. Thus, in some embodiments, at least part of the connector 12 is made of a translucent or transparent material.

FIGS. 6 illustrates a horizontal cross-section of first and second connectors 12, 14 of an example cable assembly 50. FIG. 7 illustrates vertical cross-sections of the connectors 12, 14 of the example cable assembly 50 of FIG. 6. The traceable cable assembly 50 includes a first tracing optical fiber 20 that extends along the length of the traceable cable 3 and a second tracing optical fiber 22 that extends along the traceable cable 3 in the opposite direction. Each of the first and second tracing optical fibers 20, 22 includes a light launch end 40, 42 having a bend 24, 26 and a light emission end 44, 46 that is straight. The light launch ends 40, 42 are configured to receive light from a launch tool while the light emission ends 44, 46 are configured to emit light.

The bends 24, 26 near the light launch ends 40, 42 of the first and second tracing optical fibers 20, 22 may be equal to or greater than 90 degrees to allow for convenient injection of light into the tracing optical fibers 20, 22. In some cases, only the rear portion 70, 72 of each connector 12, 14 is accessible or visible when the connectors 12, 14 are engaged in a receptacle. The bends 24, 26 of the first and second tracing optical fibers 20, 22 position the light launch ends 40, 42 at the rear portion 70, 72 of each connector 12, 14 so that the light launch ends 40, 42 are accessible to a user. As discussed in more detail below, the light emission ends 44, 46 of the tracing optical fibers 20, 22 may also be bent in some embodiments. For example, in some embodiments, the light emission ends 44, 46 include a bend of between 0 and 90 degrees. Alternatively, the light emission ends 44, 46 of the tracing optical fibers 20, 22 may be straight, as illustrated in the embodiments of FIGS. 6 and 7.

The bends 24, 26 of the tracing optical fibers 20, 22 may be located in the first and second connectors 12, 14, respectively, to protect the bends 24, 26 from damage and to maintain an appropriate bend radius. In some embodiments, the bends 24, 26 of the tracing optical fibers 20, 22 are held in place by mating surfaces of the connectors 12, 14. In yet other embodiments, the bends 24, 26 of the tracing optical fibers 20, 22 are held in place by integrating the fibers into a bent cavity within the connectors 12, 14.

As shown in FIGS. 6 and 7, the first and second tracing optical fibers 20, 22 may be oppositely oriented in the cable 3. The orientation of the first and second tracer elements 20, 22 allows a user to inject light into either end of the cable assembly 50 without disconnecting the connectors 12, 14. In use, the first tracing optical fiber 20 facilitates identification of the second connector 14 when a launch light is injected in the light launch end 40 of the first tracing optical fiber 20. Likewise, the second tracing optical fiber 22 facilitates identification of the first connector 12 when a launch light is injected in the light launch end 42 of the second tracing optical fiber 22. Thus, the user can accurately locate either end of a cable 3 without interrupting the service provided by the cable 3.

In FIGS. 6 and 7, the bends 24, 26 of the first and second tracing optical fibers 20, 22 are approximately 180 degrees. In other embodiments, the bends 24, 26 of the first and second tracing optical fibers 20, 22 may be other angles. For example, in some embodiments the bends 24, 26 are between about 0 and about 180 degrees. Referring now to FIGS. 8 and 9, the bends 24, 26 at the light injection ends 40, 42 are about 90 degrees. These bends 24, 26 may allow for injection of light into the first and second tracing optical fibers 20, 22 from a side portion 82, 84 of the connectors 12, 14. In other embodiments, the bends 24, 26 are less than 90 degrees to allow for injection of light into the first and second tracing optical fibers 20, 22 from other positions on the connectors 12, 14.

In the embodiments illustrated in FIGS. 6-9, the light launch ends 40, 42 of the first and second tracing optical fibers 20, 22 include a bend 24, 26 but the emission ends 44, 46 are substantially straight. However, in other embodiments the light emission ends 44, 46 may also include a bend. For example, in some embodiments the light injection end 40 and the emission ends 44, 46 include a bends of about 90 degrees. In other embodiments, the bend at the light emission ends 44, 46 can be between about 0 and about 90 degrees. Bends in the tracing optical fibers 20, 22 near the light emission ends 44, 46 may allow for light to be emitted from the connectors 12, 14 in a directed manner that meets the needs of a specific application or connector type.

In the embodiments illustrated in FIGS. 5-9, the light launch ends 40, 42 of the first and second tracer elements 20, 22 are substantially flush with an outer surface of the connectors 12, 14 and the light emission ends 44, 46 are contained within the connectors 12, 14. In other embodiments, however, the light launch end 40, 42 and the light emission ends 44, 46 may be located at other positions on or near the connectors 12, 14. For example, in some embodiments the first tracing optical fiber 20 passes completely through the first connector 12 so that the light injection end 40 protrudes from the first connector 12. Similarly, the second tracing optical fiber 22 may pass completely through the second connector 14 so that the light injection end 42 protrudes from the second connector 14. Positioning the light injection end 40, 42 outside of the connectors 12, 14 may facilitate more accurate coupling with a light launch tool.

In other embodiments, the light emission end 44, 46 of the first and second tracing optical fibers 20, 22 may also protrude from or be flush with an external surface of the connectors 12, 14 to enhance the visibility of the light emission ends 44, 46. Such positioning of the light emission end 44, 46 of the first and second tracing optical fibers 20, 22 may provide for enhanced light dispersion from the light emission end 44, 46. Positioning the light emission end 44, 46 of the first and second tracing optical fibers 20, 22 so that they protrude from or are flush with an external surface of the connectors 12, 14 may require a bend in the first and second tracing optical fibers 20, 22 near the light emission ends 44, 46, as discussed above.

FIGS. 10 and 11 illustrate another embodiment of a cable assembly 50. In this embodiment, the light injection ends 40, 42 of the first and second tracing fibers 20, 22 are contained within the respective connectors 12, 14 and include bends 24, 26 that are about 90 degrees. The connectors 12, 14 also include conduits 90, 92 to allow for insertion of a portion of a light injection tool. For example, in some embodiments a flexible fiber 86 is insertable into the conduits 90, 92 to inject light into the first or second tracing fibers 20, 22. The flexible fiber 86 from the light injection tool bends approximately 90 degrees to inject light into the first or second tracing fibers 20, 22. In some embodiments, the connectors 12, 14 may include one or more fiber optic connector sub-assemblies, such as ferrules, configured to mate with the flexible fiber 86 of the launch tool.

Referring again to FIGS. 6-11, the light emission ends 44, 46 of the first and second tracing optical fibers 20, 22 are configured to emit light that is visible to a user. To enhance the light that is emitted by the light emission ends 44, 46, the tracing optical fibers 20, 22 may include diffusing elements at or near the light emission ends 44, 46. The light diffusing elements can be any feature that enhances diffusion of light from the light emission ends 44, 46 of the first or second tracing optical fibers 20, 22. For example, the diffusing element may be a layer of Tio2 impregnated material, a roughened surface, a conical-shaped end, a scattering ink layer, a parabolic-shaped end, a non-planar-shaped end or any other shaping of the end of the fiber, a reflective element, a refractive element, or any combination of the foregoing. The light emission ends 44, 46 need not be polished or otherwise finely tuned which may save time and cost associated with the tracing optical fibers 20, 22 and the overall cable assembly 50. In addition, the light emission ends 44, 46 of the first and second tracing optical fibers 20, 22 need not include a bend, which may further reduce the overall cost and complexity of the cable assembly 50.

In some embodiments, additional elements are incorporated into the connector to enhance diffusion of light from the light emission ends 44, 46. For example, in the embodiment illustrated in FIG. 12 the light emitting ends 44 of the first tracing optical fiber 20 is inserted within a molded light diffuser 48 that enhances light diffusion. In other embodiments, the cladding may be removed at or near the light emission ends 44, 46 of the first and second tracing optical fibers 20, 22 to enhance light dispersion.

In place of, or in addition to, a light diffusing element, the light emission ends 44, 46 of the first and second tracer elements 20, 22 may also be positioned at or near light diffusion features of the connectors 12, 14. For example, the interior of the connector 12, 14 may include diffusive surface, materials or structures that further enhance the visibility of light from the light emission ends 44, 46 to an observer situated towards the rear portion 70, 72 of the connectors 12, 14. In the embodiment illustrated in FIGS. 9, 11 and 12, for example, the connectors 12, 14 include a conical surface 38 that deflects light from the light emission ends 44, 46 out of the connectors 12, 14. In other embodiments, the connectors 12, 14 may include non-conical shaped surfaces that direct light from the light emission ends 44, 46. In some embodiments, the connectors 12, 14 also include a reflective or refractive element or surface to enhance light emission from the connectors 12, 14. In yet other embodiments, at least part of each connector 44, 46 is made of a translucent or transparent material to allow light to escape through the connector 44, 46. In some embodiments, the light emission ends 44, 46 and the connectors 12, 14 are configured such that light emitted from the tracing optical fibers 20, 22 radiates away from the cable 3 for detection purposes without illuminating secondary parts of the cable 3 or connectors 12, 14.

Figure 13:
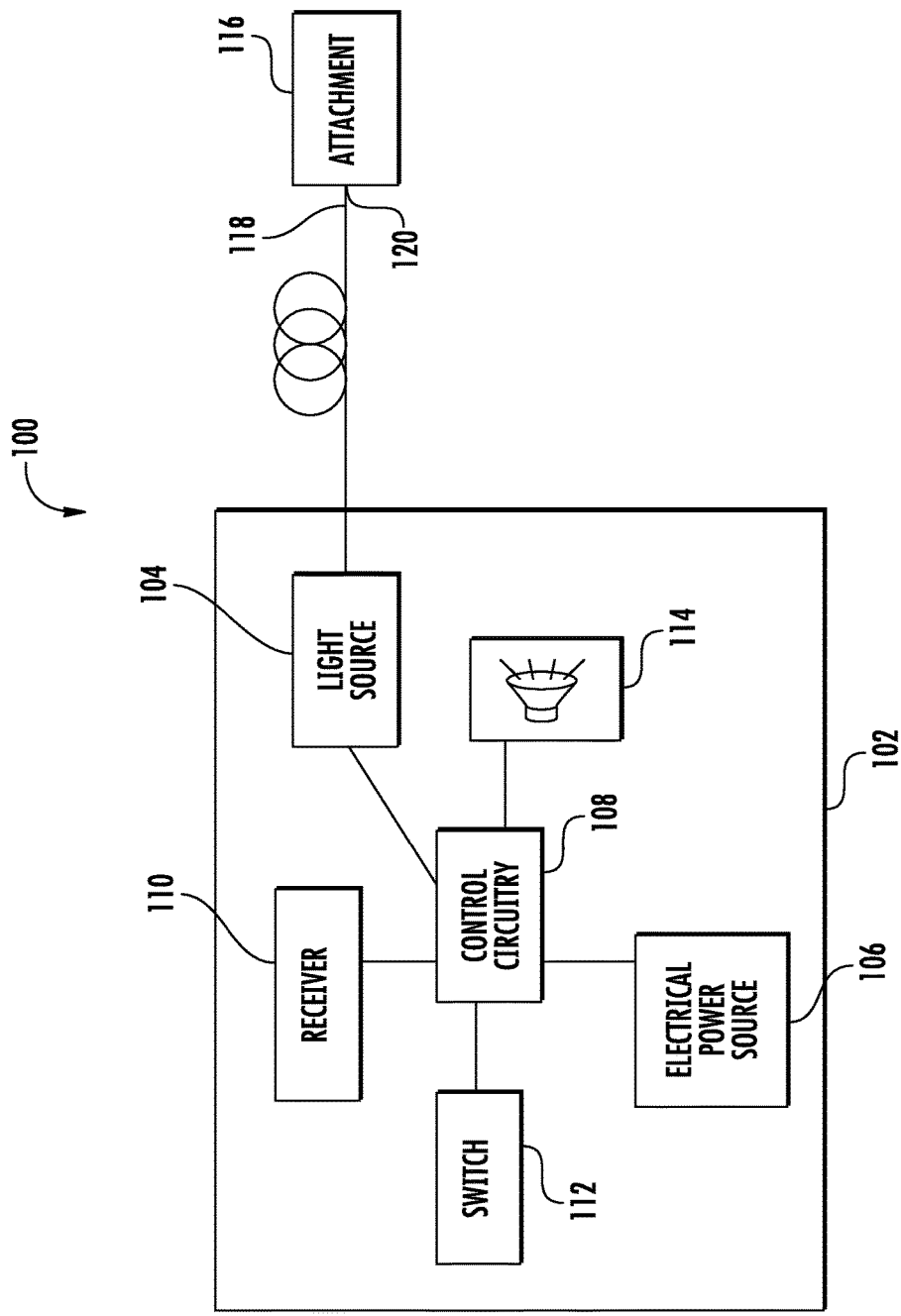
FIG. 13 is a diagrammatic illustration of a launch tool in accordance with an embodiment of the present disclosure.

Turning now to FIG. 13, an example embodiment of a launch tool 100 is diagrammatically shown. The launch tool 100 may have a number of elements stored in a housing 102, including the light source 104 (e.g., a red or green laser), an electrical power source 106 (e.g., batteries), and control circuitry 108 respectively connected to other components of the launch tool 100, such as to control the light source 104 and power usage. A receiver 110 or other wireless communication components may be also included in or on the housing 102 to receive commands from an external controller. Furthermore, the launch tool 100 may include an on-off switch 112 and one or more user interface features, such as a speaker 114 to allow for the generation of audible signals. The housing 102 may be approximately the size of a standard flashlight or much smaller or larger depending on the application. The housing 102 should be sufficiently durable to protect the launch tool 100, even in the event of a drop onto a hard surface. It should be noted that the components of the launch tool 100 may be located inside or outside the housing 102. For example, in some embodiments the light source 104 is located at the attachment 116 rather than in the housing 102.

In one embodiment, the light source 104 may emit a wavelength that is chosen to enhance visibility, such as a wavelength as near to 555 nm as possible. In some embodiments, the light source 104 is a 520-540 nm green laser diode, LED or super-luminescent diode (SLD). Alternatively, other colors/wavelengths may be emitted, such as red light from approximately 620-650 nm. In other embodiments, non-laser light sources may be used, such as light emitting diodes (LEDs). Several factors may be considered when selecting an appropriate light source 104, and the factors may include, but are not limited to, visibility, cost, eye safety, peak power, power consumption, size, and commercial availability. While the light source 104 is part of the housing 102 in FIG. 13, the light source 104 may be part of the attachment 116 or may be located elsewhere on the launch tool 100, such as on the delivery waveguide 118. In some embodiments, the power of the light source 104 is as high as can be used safely according to industry safety standards, such as a green laser up to 40 mW coupled to a multimode delivery waveguide fiber with core diameter of about 50 microns or more and a numerical aperture about 0.2 or more.

The launch tool 100 of FIG. 13 includes a delivery waveguide 118, which is sometimes referred to as an umbilical. The delivery waveguide 118 provides a path for transmitting light and/or electrical power to an emission end 120 of the delivery waveguide 118. The delivery waveguide 118 may be several meters in length, for example, so that the housing 102 of the launch tool 100 can be placed on the ground while the attachment 116 is at least indirectly coupled with the traceable cable assembly 50 several meters away.

The attachment 60 may be mounted to, or otherwise provided at or near the light launch ends 40, 42 of the first or second tracing optical fibers 20, 22. The attachment 60 may help provide a high efficiency launch of light into the tracing optical fibers 20, 22.

Example launch tools 100 are shown schematically in FIGS. 14 and 15 coupled to a first connector 12 of a cable assembly 50. In FIG. 14, the launch tool 100 includes a housing 102, a delivery waveguide 118 and an attachment 116, as described above. In FIG. 15, the above-described features of the launch tool 100 are contained within the housing 102 and the housing 102 is configured for attachment to the connector 12 and/or the light launch end 40, 42 of the tracing optical fibers 20, 22.

Figure 16:
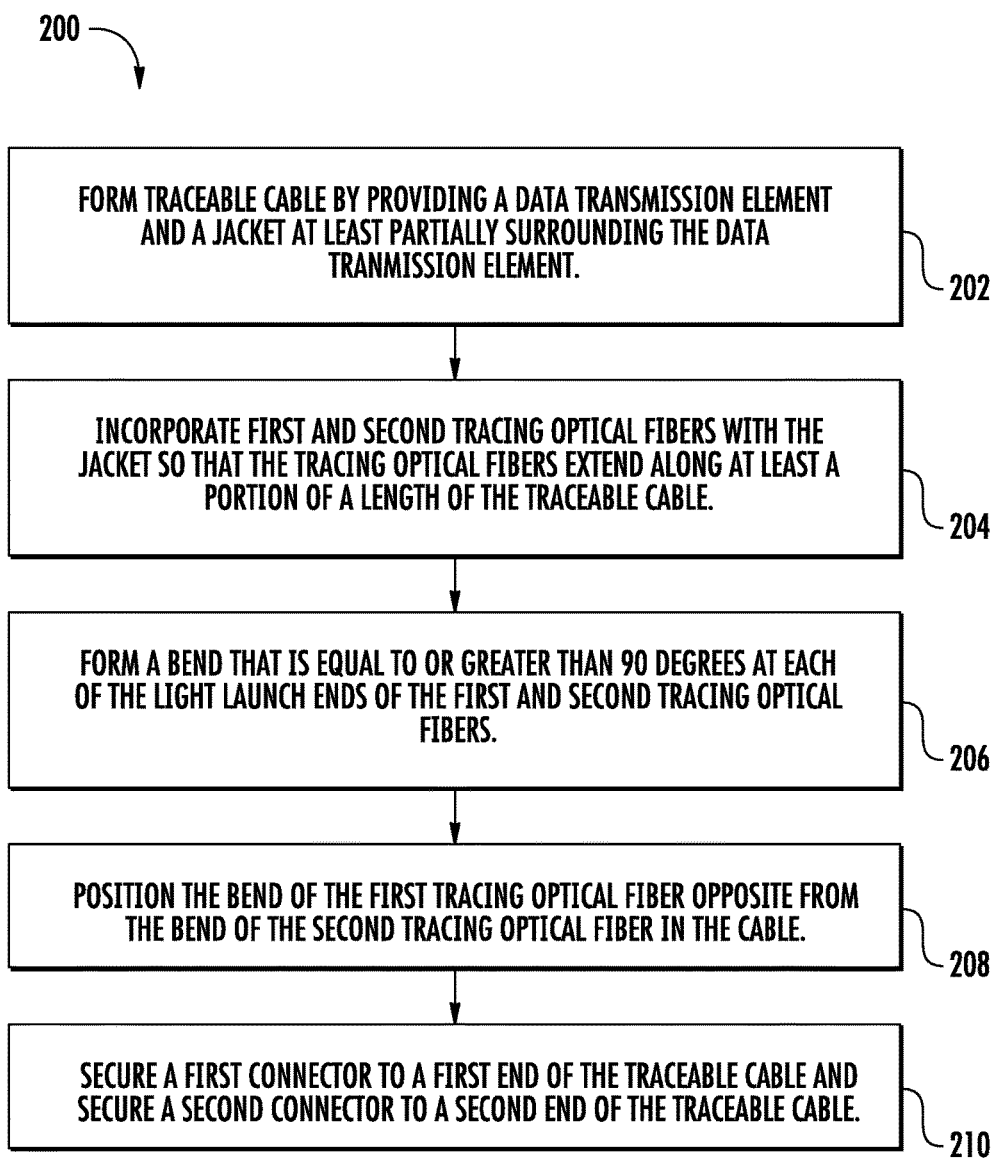
FIG. 16 is a schematic diagram showing a method of forming a traceable cable assembly in accordance with an embodiment of the present disclosure.

Traceable cable assemblies 50 according to this disclosure may be manufactured according to a method 200 schematically illustrated in FIGS. 16. The method 200 begins and a traceable cable 3 is formed by providing a data transmission element 7 and a jacket 10 at least partially surrounding the data transmission element 7, as illustrated at block 202. First and second tracing optical fibers 20, 22 are incorporated with the jacket 10 so that the tracing optical fibers 20, 22 extend along at least a portion of a length of the traceable cable 3, as illustrated at block 204. The first and second traceable optical fibers 20, 22 each include a light launch end 40, 42 and a light emission end 44, 46. Each of the light launch ends 40, 42 may include a bend 24, 26 that is equal to or greater than 90 degrees, as illustrated at block 206. The bend 24 of the first tracing optical fiber 20 is positioned opposite from the bend 26 of the second tracing optical fiber 22, as illustrated at block 208. A first connector 12 is secured to a first end of the traceable cable 3 and a second connector 14 is secured to a second end of the traceable cable 3, as illustrated at block 210.

In some embodiments, the method 200 also includes locating the bend 24 of the first tracing optical fiber 20 in the first connector 12 and locating the bend 26 of the second tracing optical fiber 22 in the second connector 14. As discussed above, the light emission end 44, 46 of the first and second tracing optical fibers 20, 22 may be located inside or outside of the first and second connectors 12, 14.

In some embodiments, the method 200 also includes forming a second bend in the light emission ends 44, 46 of the first and second tracing optical fibers 20, 22 that is equal to or less than 90 degrees. The method 200 may also include forming a light diffusing element on or near the light emission ends 44, 46 of the first and second tracing optical fibers 20, 22. The method 200 may also include removing the cladding 34 from the light emission ends 44, 46 of the first and second tracing optical fibers 20, 22 to enhance light emission from the tracing optical fibers 20, 22.

Persons skilled in optical connectivity will appreciate additional variations and modifications of the devices and methods already described. For example, in some embodiments the bends 24, 26 of the tracing optical fibers 20, 22 may be aligned on the same end of the cable assembly 50 and may form part of the same connector 12, 14. In such embodiments, the cable assembly 50 may be a one-way cable assembly 50 that facilitates tracing in only one direction.

In other embodiments, the cable 3 includes more than two tracing optical fibers and at least one of the tracing optical fibers may include a bend (e.g., bends 24, 26) positioned at or near the first connector 12 while another of the tracing optical fibers includes a bend at the second connector 14.

In yet other embodiments, the cable 3 includes more than two tracing optical fibers and all of the bends of those tracing optical fibers are located at either the first or second connector 12, 14. Once again, this embodiment provides a one-way cable assembly that facilitates tracing in only one direction. Such "one-direction" cable assemblies may be limited in functionality but may provide a more cost-efficient solution for certain applications.

In some embodiments, both the light launch ends 40, 42 and the light emission ends 44, 46 of the tracing optical fibers 20, 22 are accessible to a user and may function as either the light injection end or the light emission end. For example, in some embodiments the light launch end and the light emission end of the tracing optical fibers 20, 22 includes bends between about 0 and about 180 degrees, as such, both the light launch end and the light emission end are positionable on the connectors 12, 14 to be accessible to a user. For example, the light launch ends and the light emission ends of both the first and second tracing optical fibers 20, 22 may be flush with a surface of the connector so that they are accessible to inject light therein or see light emitted therefrom.

As discussed above, one or both of the light launch ends 40, 42 and the light emission ends 44, 46 of the tracing optical fibers 20, 22 may be contained within a connector 12, 14. In some embodiments, the light emission ends 44, 46 are visible through the connector 12, 14 because the connector is at least partially formed of a transparent or translucent material. In other embodiments, the light emission ends 44, 46 are not necessarily visible through the connector 12, 14 but the light from the light emission ends 44, 46 illuminates some or all of the connector 12, 14.

In yet other embodiments, one or both of the light launch ends 40, 42 and the light emission ends 44, 46 of the traceable optical fibers 20, 22 is positioned outside of the connectors 12, 14. In some embodiments, for example, the exposed ends of the fibers 20, 22 protrude outside the connectors 12, 14 by less than about 2 mm, less than about 1 mm or less than about 0.5 mm. In some embodiments, the exposed ends of the tracing optical fibers 20, 22 are recessed within one or more cavities in the connector 12, 14 so that the exposed ends are recessed within and protected by the cavities. In other embodiments, the exposed ends of the tracing optical fibers 20, 22 are flush with the connector body within a cavity in the connector body.

In some embodiments, the ends 40, 42, 44, 46 of the tracing optical fibers 20, 22 and the bends 24, 26 of the tracing optical fibers 20, 22 are held in place at mating surfaces of the connectors 12, 14 when the connectors 12, 14 are assembled. In yet other embodiments, the ends 40, 42, 44, 46 of the tracing optical fibers 20, 22 are held in place substantially or wholly by one connector part (i.e., not at mating surfaces of the connectors 12, 14).

Figure 17:
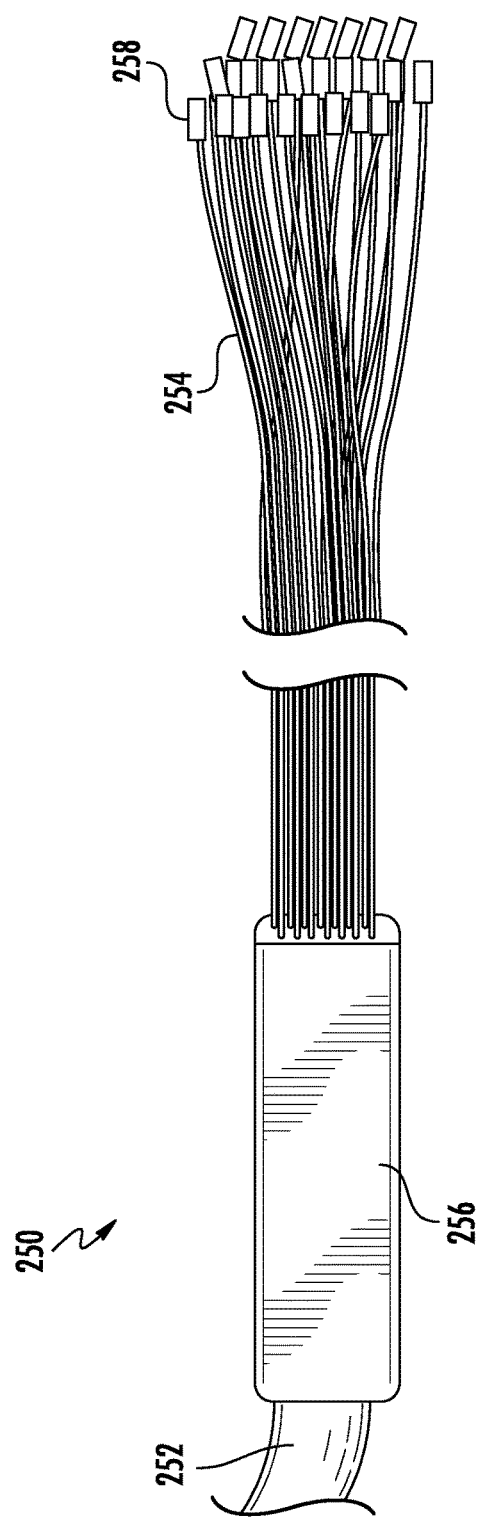
FIG. 17 is a perspective view of a portion of a traceable cable assembly according to another embodiment of the present disclosure.

FIGS. 17-20 illustrate various combinations of the some of the possibilities mentioned above or elsewhere in this disclosure, along with other possibilities that will be appreciated. In particular, although the cable assembly 50 may have been depicted as a "jumper cable" or "patch cord," the principles of the present disclosure may be applied to other cable types. To this end, FIG. 17 illustrates one end portion a cable assembly 250 in the form of a "trunk cable" having a main cable portion 252 that breaks out (i.e., furcates) into a plurality of leg portions 254 (also referred to simply as "legs"). The break-out occurs in a first furcation body 256, which may be a cured epoxy plug, molded component, heat shrink, sealed housing, or the like. Each leg portion 254 terminates in a connector 258, which may be any type of connector (e.g., LC, SC, MPO) in simplex or duplex form, and which may serve the same purpose as the first and second connectors 12, 14 discussed above in connection with the cable assembly 50. Thus, the description of the first and second connectors 12, 14 applies equally to the connectors 258. For example, each of the connectors 258 may include the light launch end 40 of the first tracing optical fiber 20 and the light emission end 46 of the second tracing optical fiber 22. The first and second tracing optical fibers 20, 22 may extend through the associated leg portion 254, through the first furcation body 256, and through the main cable portion 252 to the opposite end portion (not shown) of the trunk cable assembly 250, which may be similarly constructed.

Figure 18:
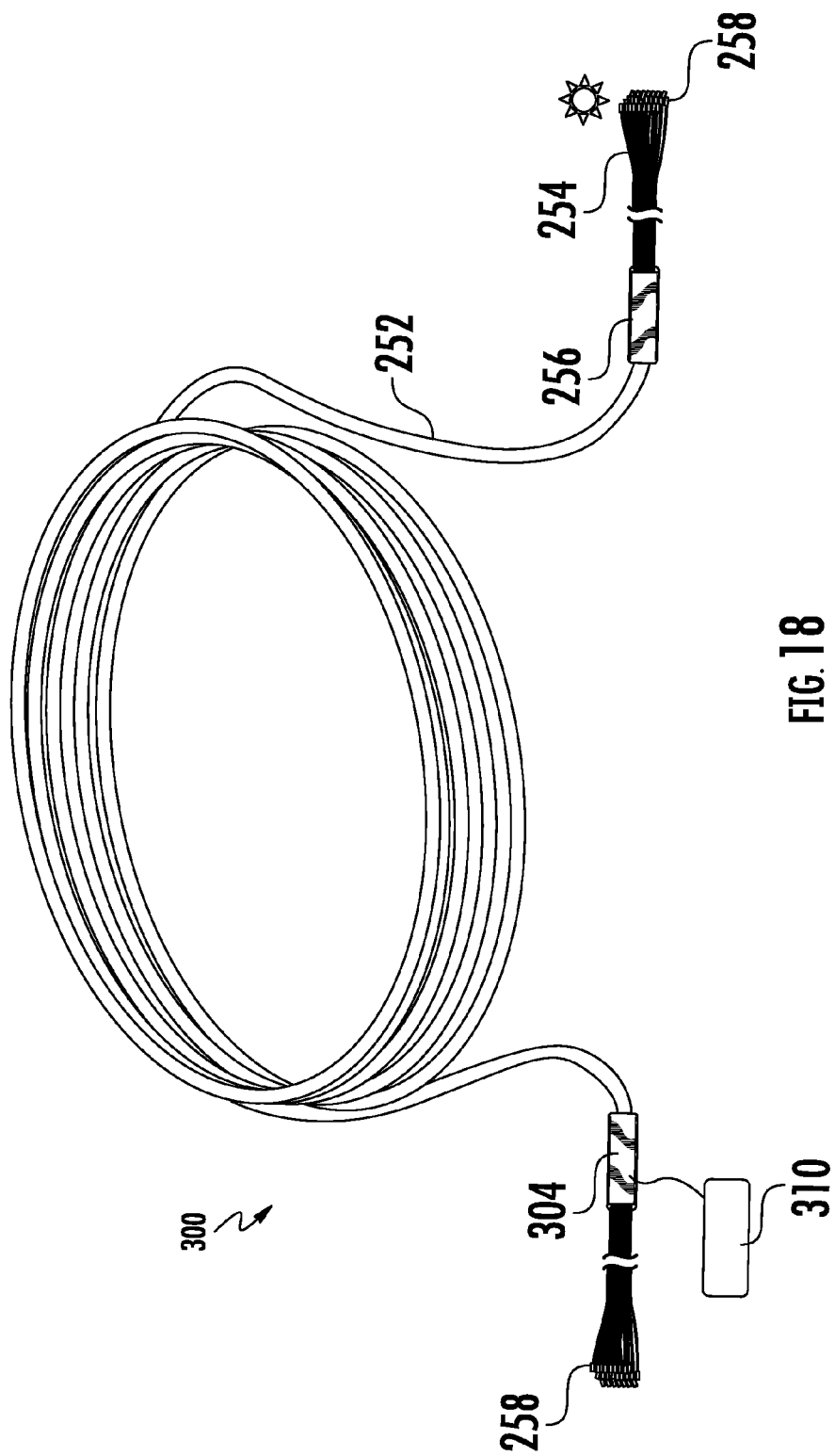
FIGS. 18-20 are schematic illustrations of traceable cable assemblies and launch tools according to alternative embodiments of the present disclosure.

It was mentioned above how one or both of the light launch ends 40, 42 and the light emission ends 44, 46 of the first and second tracing optical fibers 20, 22 may be positioned outside of the first and second connectors 12, 14. As an example in the context of a trunk cable assembly, one or both of the light launch ends 40, 42 and the light emission ends 44, 46 of the first and second tracing optical fibers 20, 22 may be positioned in a furcation body. To this end, FIG. 18 schematically illustrates a trunk cable assembly 300 similar to the trunk cable assembly 250 (FIG. 17), except that the light launch ends of tracing optical fibers whose light emission ends are at connectors 258 are located at a second furcation body 304 on an opposite end portion of the trunk cable assembly 300. Thus, there may be a plurality of light launch ends at the second furcation body 304 for the plurality of tracing optical fibers each having a light emission end at or near one of the connectors 258 on the opposite end portion of the trunk cable assembly 300. A launch tool 310 may selectively couple to the various light emission ends at the second furcation body 304 depending on the desired connector 258 to be traced.

Figure 19:
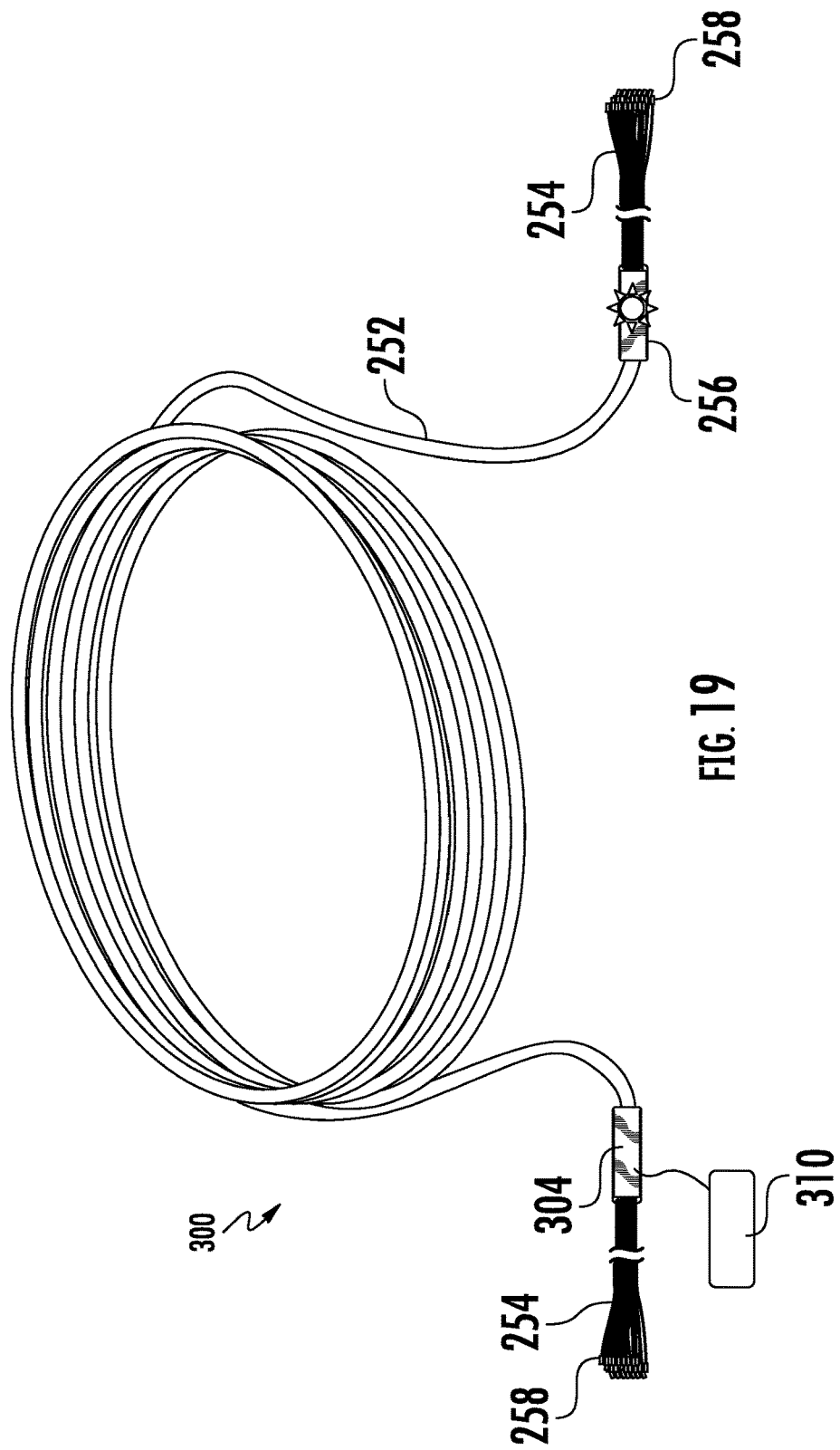

FIG. 19, on the other hand, schematically illustrates a trunk cable assembly 350 where both the light launch ends and light emission ends of tracing optical fibers are located at opposite furcation bodies. For example, a first tracing optical fiber (not shown) may have a first light launch end at the second furcation body 304 and a first light emission end at the first furcation body 256, and a second tracing optical fiber (also not shown) may have a second light launch end at the first furcation body 256 and a second light emission end at the second furcation body 304. Although the launch tool 310 for launching light into the tracing optical fibers is schematically illustrated in connection with the second furcation body 304, the launch tool 310 may also interface with the first furcation body 256 in a similar manner.

Figure 20:
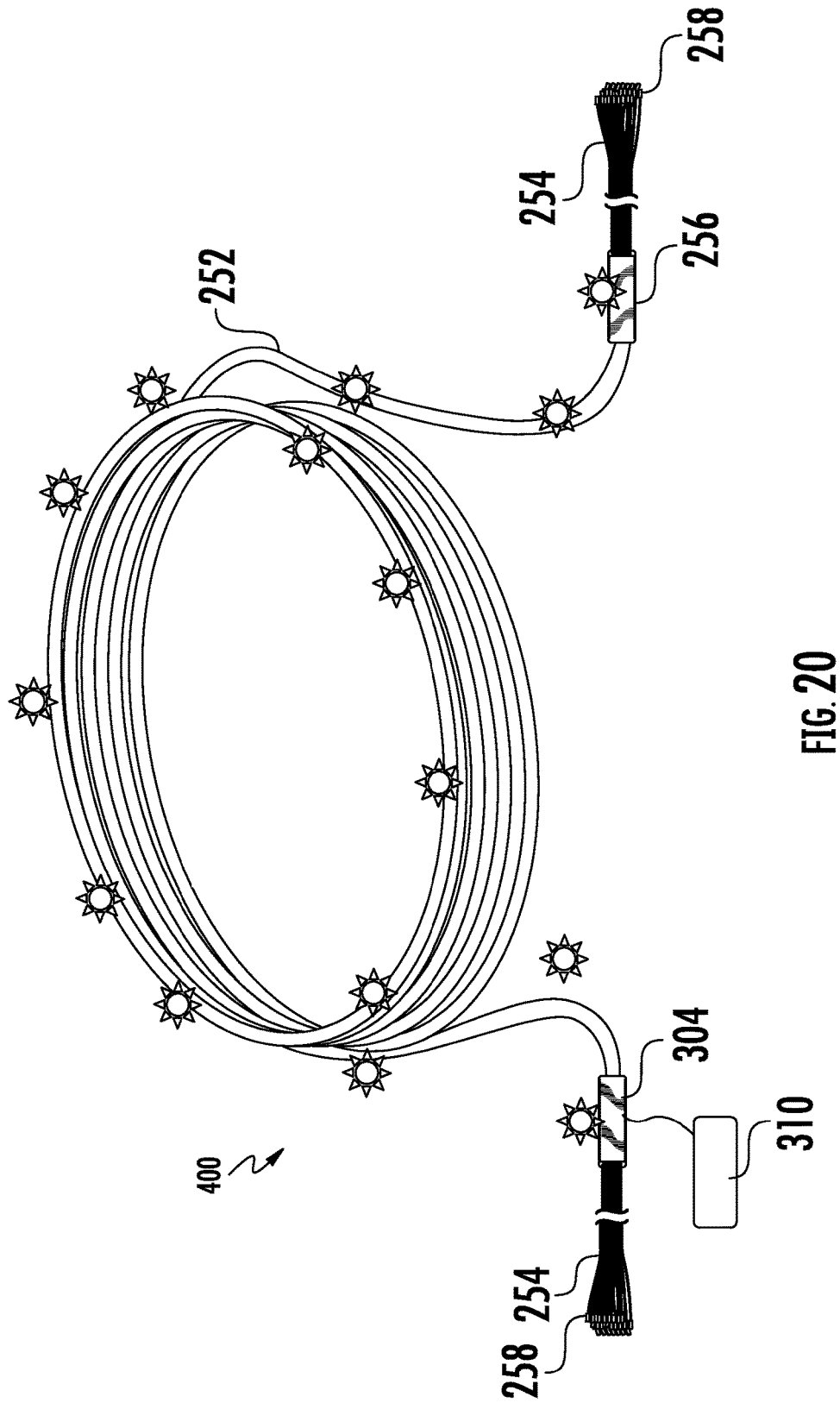

Embodiments will also be appreciated where tracing optical fibers are used to not just trace end portions of a trunk cable assembly, but also to trace significant lengths of the cable assembly. For example, FIG. 20 schematically illustrates an embodiment of a trunk cable assembly 400 similar to the trunk cable assembly 350 (FIG. 19), except that the main cable portion 252 of the trunk cable assembly 400 may be illuminated by one or more tracing optical fibers (not shown) extending between the first and second furcation bodies 256, 304. Various techniques for illuminating lengths of cables with tracing optical fibers are disclosed in U.S. Pat. No. 9,304,278 and U.S. Patent Application Pub. No. 2016/0341922, the disclosures of which are fully incorporated herein by reference.

Where a system claim below does not explicitly recite a component mentioned in the description above, it should not be assumed that the component is required by the claim. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

We claim:

1. A traceable cable assembly, comprising:
    a traceable cable, comprising:
        at least one data transmission element;
        a jacket at least partially surrounding the at least one data transmission element;
        a first tracing optical fiber extending along at least a portion of a length of the traceable cable, wherein the first tracing optical fiber comprises a light launch end and a light emission end, wherein the light launch end comprises a first bend; and
        a second tracing optical fiber extending along the portion of the length of the traceable cable, wherein the second tracing optical fiber comprises a light launch end and a light emission end, wherein the light launch end comprises a second bend;
    a first connector provided at a first end of the traceable cable and a second connector provided at a second end of the traceable cable;
    wherein the first tracing optical fiber facilitates identification of the second connector when a launch light is injected in the light launch end of the first tracing optical fiber;
    wherein the second tracing optical fiber facilitates identification of the first connector when the launch light is injected in the light launch end of the second tracing optical fiber;
    wherein the light launch end of the first tracing optical fiber is positioned opposite from the light launch end of the second tracing optical fiber; and
    wherein the first bend is located in the first connector and the second bend is located in the second connector.

2. The traceable cable assembly of claim 1, wherein the light emission end of the first tracing optical fiber is located in the second connector and the light emission end of the second tracing optical fiber is located in the first connector.

3. The traceable cable assembly of claim 1, wherein the light emission end of the first tracing optical fiber is located near the second connector and the light emission end of the second tracing optical fiber is located near the first connector.

4. The traceable cable assembly of claim 3, wherein the first tracing optical fiber passes through the second connector and the light emission end of the first tracing optical fiber protrudes outside of the second connector, and wherein the second tracing optical fiber passes through the first connector and the light emission end of the second tracing optical fiber protrudes outside of the first connector.

5. The traceable cable assembly of claim 1, wherein the light emission end of the first tracing optical fiber comprises a third bend that is equal to or less than 90 degrees.

6. The traceable cable assembly of claim 5, wherein the light emission end of the second tracing optical fiber comprises a fourth bend that is equal to or less than 90 degrees.

7. The traceable cable assembly of claim 1, wherein the first tracing optical fiber comprises a core and a cladding, wherein the cladding is removed at the light emission end of the first tracing optical fiber.

8. The traceable cable assembly of claim 1, wherein the light emission end of the first tracing optical fiber comprises a diffusing element.

9. The traceable cable assembly of claim 8, wherein the diffusing element is selected from the group comprising a layer of TiO2 impregnated material, a roughened surface, a conical-shaped end, a reflective surface, a refractive surface and a parabolic-shaped end.

10. The traceable cable assembly of claim 1, wherein the light emission end of the first tracing optical fiber is capable of illuminating at least a portion of the second connector when light is launched into the light launch end of the first tracing optical fiber.

11. The traceable cable assembly of claim 1, further comprising a launch light tool for emitting light into the first tracing optical fiber or the second tracing optical fiber.

12. The traceable cable assembly of claim 1, wherein the first bend of the first tracing optical fiber is about 180 degrees to allow for illumination of the light launch end of the first tracing optical fiber when the first connector is engaged in a connector receptacle.

13. The traceable cable assembly of claim 1, wherein the first bend is equal to or greater than 90 degrees and the second bend is equal to or greater than 90 degrees.

14. The traceable cable assembly of claim 1, wherein the first bend is the only bend in the first tracing optical fiber and the second bend is the only bend in the second tracing optical fiber.

15. A traceable cable assembly, comprising:
    a traceable cable, comprising:
        at least one data transmission element;
        a jacket at least partially surrounding the at least one data transmission element;
        a first tracing optical fiber extending along at least a portion of a length of the traceable cable, wherein the first tracing optical fiber comprises a light launch end and a light emission end, wherein the light launch end comprises a first bend; and
        a second tracing optical fiber extending along the portion of the length of the traceable cable, wherein the second tracing optical fiber comprises a light launch end and a light emission end, wherein the light launch end comprises a second bend;
    a first connector provided at a first end of the traceable cable and a second connector provided at a second end of the traceable cable;
    wherein the first tracing optical fiber facilitates identification of the second connector when a launch light is injected in the light launch end of the first tracing optical fiber; and
    wherein the second tracing optical fiber facilitates identification of the first connector when the launch light is injected in the light launch end of the second tracing optical fiber;
    wherein the light launch end of the first tracing optical fiber is positioned opposite from the light launch end of the second tracing optical fiber; and
    wherein the first bend is located near the first connector and the second bend is located near the second connector.

16. A traceable cable assembly, comprising:
a traceable cable, comprising:
at least one data transmission element,
a jacket at least partially surrounding the at least one data transmission element, and
a first tracing optical fiber extending along at least a portion of a length of the traceable cable, wherein the first tracing optical fiber comprising a light launch end and a light emission end, wherein the light launch end of the first tracing optical fiber comprises a first bend that is equal to or greater than 90 degrees, wherein the light emission end of the first tracing optical fiber comprises a diffusing element;
a second tracing optical fiber extending along the portion of the length of the traceable cable, wherein the second tracing optical fiber comprises a light launch end and a light emission end, wherein the light launch end of the second tracing optical fiber comprises a second bend that is equal to or greater than 90 degrees,
wherein the light launch end of the first tracing optical fiber is positioned opposite from the light launch end of the second tracing optical fiber;
a first connector provided at a first end of the traceable cable and a second connector provided at a second end of the traceable cable, wherein the first bend of the first tracing optical fiber is located in the first connector and the second bend of the second tracing optical fiber is located in the second connector;
wherein the first tracing optical fiber facilitates identification of the second connector when a launch light is injected in the light launch end of the first tracing optical fiber; and
wherein the second tracing optical fiber facilitates identification of the first connector when the launch light is injected in the light launch end of the second tracing optical fiber.

* * * * *